(12) United States Patent
Hosokawa et al.

(10) Patent No.: US 6,367,811 B1
(45) Date of Patent: Apr. 9, 2002

(54) ROTATION SHAFT SEAL

(75) Inventors: Atsushi Hosokawa; Hiromi Obata; Takeshi Baba; Tomoya Inagaki, all of Arida; Toshiro Fujii, Kariya; Takayuki Imai, Kariya; Naoya Yokomachi, Kariya; Kazuo Murakami, Kariya, all of (JP)

(73) Assignees: Mitsubishi Cable Industries, Ltd., Hyogo; Kabushiki Kaisya Toyoda Jidoshokki Seisakusho, Aichi (JP)

( * ) Notice: Subject to any disclaimer, the term of this patent is extended or adjusted under 35 U.S.C. 154(b) by 0 days.

(21) Appl. No.: 09/444,390

(22) Filed: Nov. 22, 1999

(30) Foreign Application Priority Data

| Nov. 24, 1998 | (JP) | ............ 10-332574 |
| Dec. 18, 1998 | (JP) | ............ 10-360922 |
| Apr. 15, 1999 | (JP) | ............ 11-107437 |
| Sep. 2, 1999 | (JP) | ............ 11-248878 |
| Sep. 2, 1999 | (JP) | ............ 11-248879 |

(51) Int. Cl.[7] .............................. F16J 15/32
(52) U.S. Cl. ................. 277/560; 277/564; 277/569; 277/572
(58) Field of Search ................ 277/375, 560, 277/562, 564, 569, 572

(56) References Cited

U.S. PATENT DOCUMENTS

| 3,254,898 A | * | 6/1966 | Herbenar et al. |
| 3,497,224 A | * | 2/1970 | Pippert |
| 3,801,114 A | * | 4/1974 | Bentley |
| 3,938,813 A | * | 2/1976 | Forch |
| 4,026,563 A | * | 5/1977 | Bainard |
| 4,411,439 A | * | 10/1983 | Couvillion et al. |
| 4,623,153 A | * | 11/1986 | Nagasawa |
| 4,637,295 A | * | 1/1987 | Powers et al. ............ 92/170 |
| 4,755,115 A | * | 7/1988 | Akaike ................. 418/104 |
| 4,834,397 A | * | 5/1989 | Shimasaki et al. |
| 5,056,799 A | * | 10/1991 | Tekenaka et al. |
| 5,106,565 A | * | 4/1992 | Saitoh .................. 264/263 |
| 5,329,898 A | * | 7/1994 | Nelson et al. ......... 123/195 C |
| 5,860,656 A | * | 1/1999 | Obata et al. ........... 277/559 |
| 6,123,514 A | * | 9/2000 | Kawaguchi et al. ..... 417/222.2 |

FOREIGN PATENT DOCUMENTS

| JP | 2-43711 | | 12/1990 | |
| JP | 3-189480 | * | 8/1991 | |
| JP | 6-58426 | * | 3/1994 | ............ 277/560 |
| JP | 6-129546 | * | 5/1994 | |
| JP | 6-300142 | * | 10/1994 | |

* cited by examiner

Primary Examiner—Anthony Knight
Assistant Examiner—Alison K. Pickard
(74) Attorney, Agent, or Firm—Armstrong, Westerman & Hattori, LLP

(57) ABSTRACT

A rotating shaft seal provided with a seal element, arranged between a housing and a rotation shaft, which contacts the rotation shaft, and a seal member made of rubber having a lip end portion, disposed on a fluid storing chamber side to the seal element, which contacts the rotation shaft, comprising a supporting metal for supporting a rear face of the seal member of rubber.

11 Claims, 35 Drawing Sheets

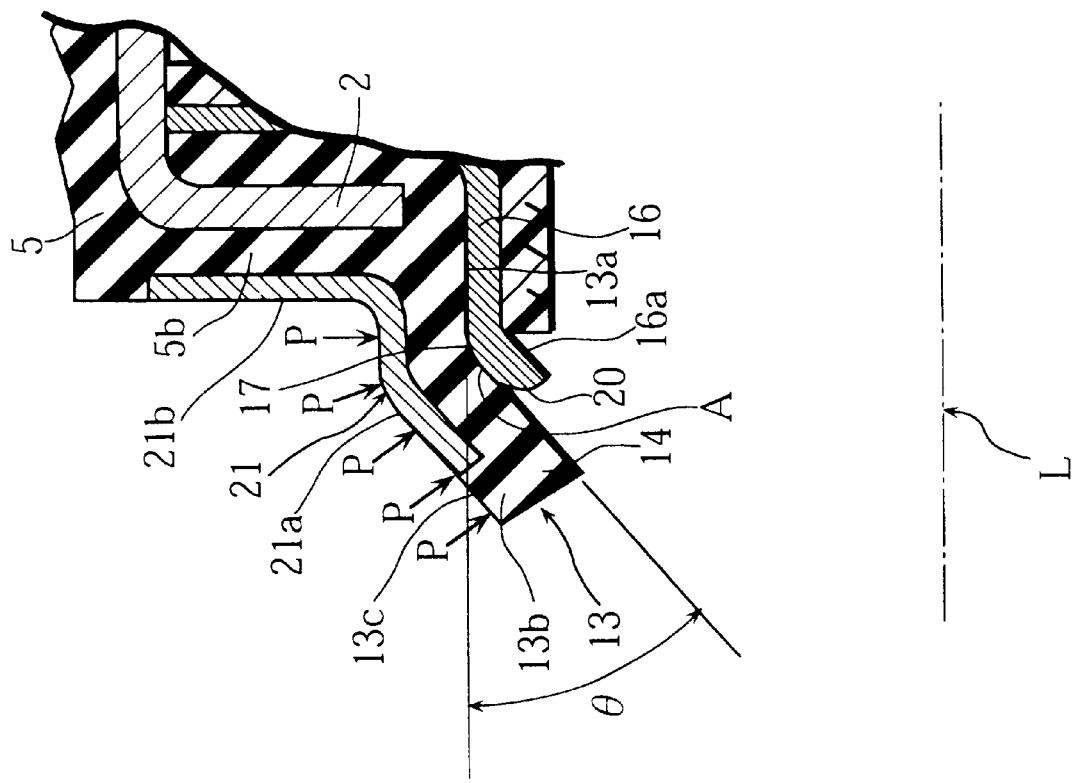
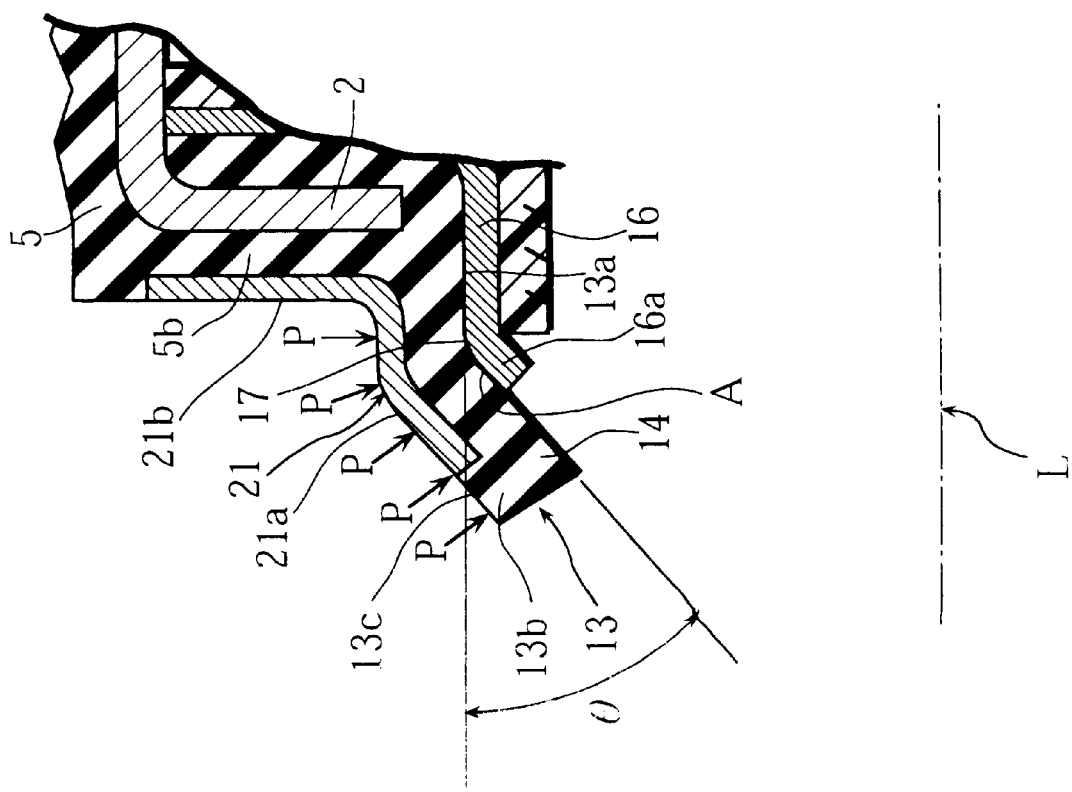

Fig. 11
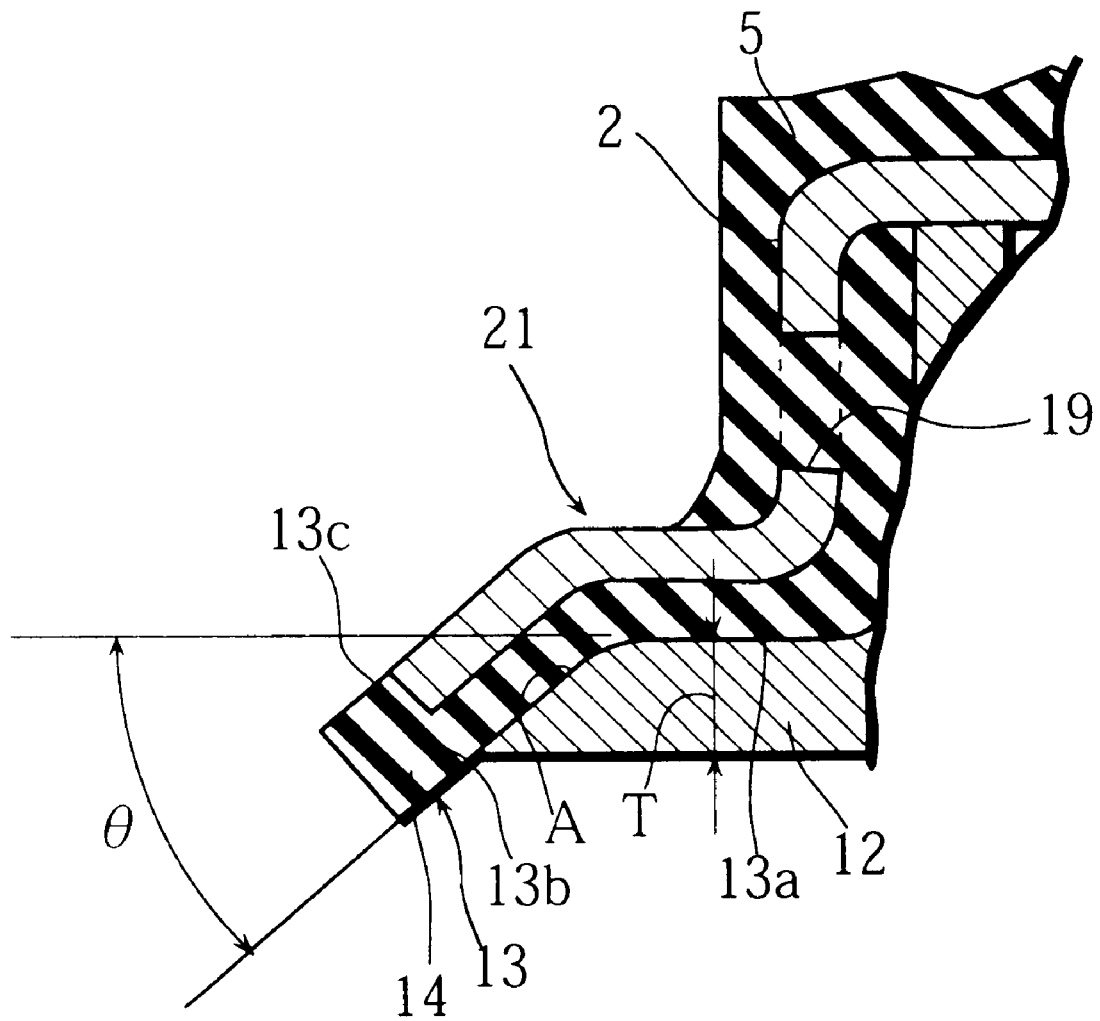

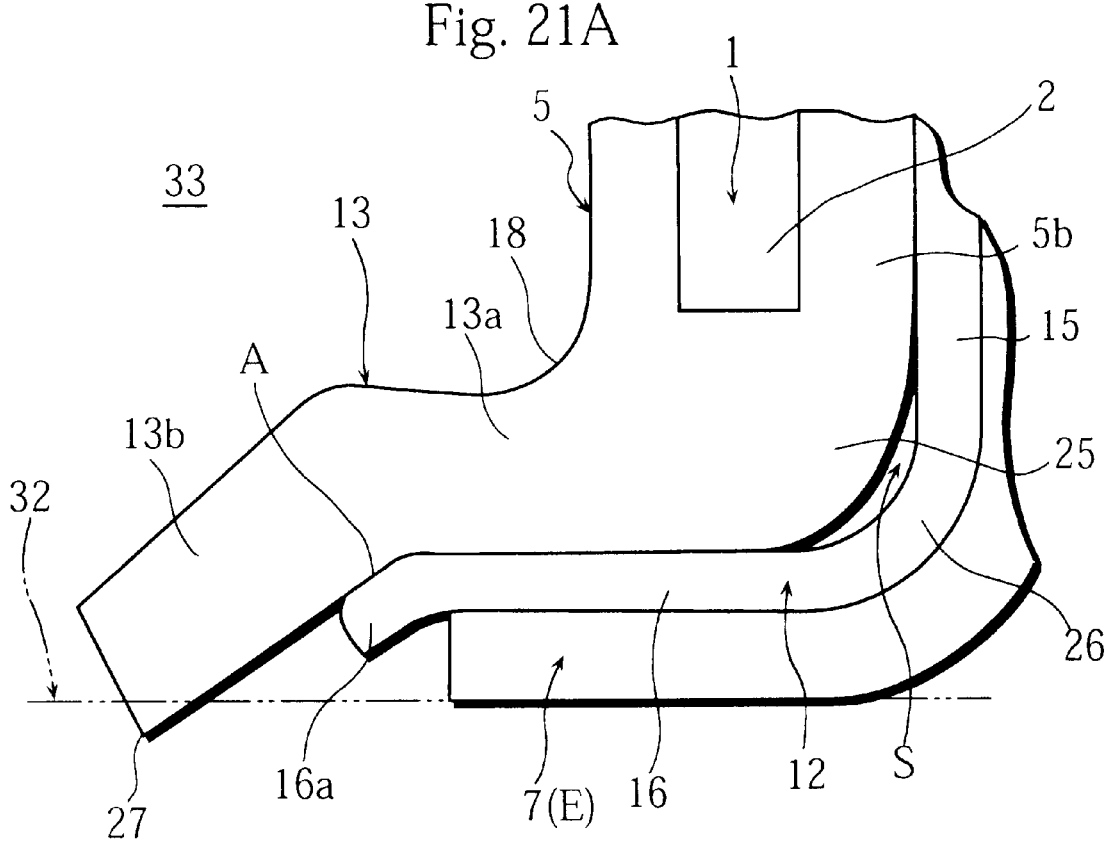
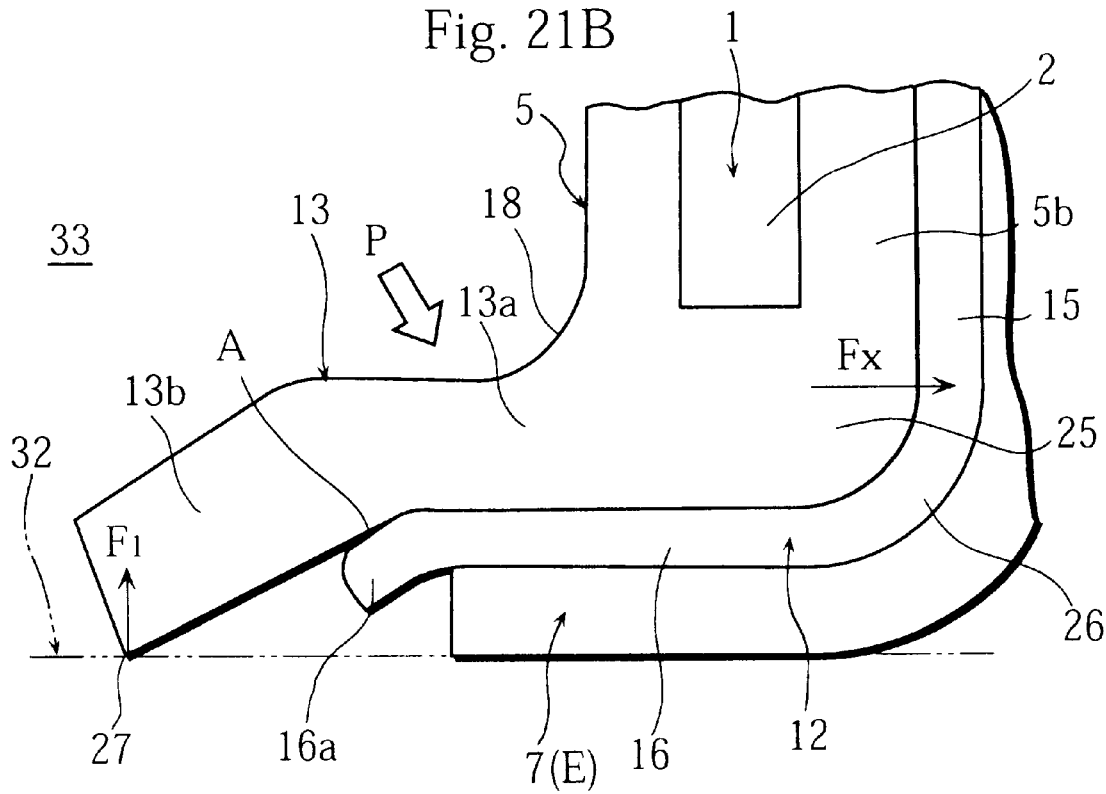

ROTATION SHAFT SEAL

BACKGROUND OF THE INVENTION

1. Field of the Invention

This invention relates to a rotation shaft seal, especially, a rotation shaft seal used for sealing high pressure fluid in a compressor for an air conditioner on an automobile.

2. Description of the Related Art

As a conventional rotation shaft seal of this kind, a shaft seal as shown in FIG. 41 is known. This rotation shaft seal is disposed between a housing 31 such as a case of a compressor and a rotation shaft 32 for sealing fluid or gas in a fluid storing chamber 33.

In the construction of the shaft seal, a seal member 35 made of rubber is adhered to an outer case 34, and a first seal element 36 and a second seal element 37 made of synthetic resin (such as PTFE) having spiral grooves are unified with a first inner case 38, a washer 39, a second inner case 40, etc. in the outer case 34 (by caulking).

The seal member 35 made of rubber is provided with a lip portion 42 protruding to the fluid storing chamber 33 side, the lip portion 42 has a concave portion 44 in a peripheral direction on the fluid storing chamber 33 side and a lip end portion 41 gradually diminishes in diameter to the fluid storing chamber 33 side, and, a tip of the lip end portion 41 contacts the rotation shaft 32 as to make a belt contact area to seal. That is to say, when the shaft is still, fluid is completely sealed by pressure of the fluid storing chamber 33 and elastic force of the lip end portion 41 itself.

And, when the rotation shaft 32 rotates, although slight leakage is generated in a sliding portion of the lip end portion 41 and the rotation shaft 32, the leakage is pushed back (to the left side in FIG. 41) by hydrodynamic effect of the spiral grooves (screw threads) of the first seal element 36 and the second seal element 37. The construction can seal the fluid as a whole.

To describe concretely, as shown in FIG. 42A, in the seal member 35 made of rubber in a non-attached state to the rotation shaft 32 (free state), an interference G is arranged on the lip end portion 41 to form an interference portion 46 inner to the periphery of the rotation shaft 32. And, as shown in FIG. 42B, in the seal member 35 attached to the rotation shaft 32, tightening force $F_{11}$ generated by elasticity of rubber works on a contact portion 43 (with the rotation shaft 32) of the lip end portion 41 (the interference portion 46) to a peripheral face of the rotation shaft 32. And, as shown in FIG. 42C, in the seal member 35 pressurized (by pressure P of the fluid) in a pressurizing state of the fluid storing chamber 33, self-sealing force $F_{12}$ (generated by pressurization) and the tightening force $F_{11}$ (working continuously) work on the contact portion 43. Consequently, total force $F_{15}$ (=$F_{11}$+$F_{12}$) works on the contact portion 43 to the peripheral face of the rotation shaft 32.

In the conventional seal described above, in case that the pressure in the fluid storing chamber 33 is high, the lip end portion 41 contacts the rotation shaft 32 with a large area for great deformation (by high pressure working in an arrow P direction in FIG. 42C), sealability becomes unstable, and sealability of the first seal element 36 is also influenced. This causes problems that leakage is generated early, and abrasion of the contact portion of the lip end portion 41 with the rotation shaft 32 is large.

Further, root of the lip portion 42 has larger pressure receiving area and smaller amount of rubber (in comparison with other parts of the lip portion 42) for the concave portion 44. Therefore, fissures on the root of the lip portion 42 and exfoliation of the seal member 35 from the outer case 34 are generated because the root of the lip portion 42 is greatly deformed by the high pressure and stress is successively generated from the surface of the lip portion 42 to the outer case 34. Further, there is a problem that the contact portion of the lip end portion 41 with the rotation shaft 32 becomes larger, and lifetime of the seal is shortened.

Further, in case that carbon dioxide, having high permeability against rubber and resin, is used as a cooling medium, carbon dioxide permeates the seal member 35 made of rubber, the first seal element 36, and the second seal element 37 and leaks from the seal. That is to say, when leakage of the cooling medium is large, the cooling medium becomes short early, and inconvenience such as reduction of cooling effect for shortage of cooling medium is caused thereby.

It is therefore an object of the present invention to provide a rotation shaft seal used especially under high pressure (around 3 to 10 MPa, for use of high pressure cooling media such as $CO_2$), with which leakage of the cooling medium is restricted, deformation of the lip end portion is small, the lip end portion has good durability for prevention of early abrasion, and sealability is stable with the contact area prevented from being enlarged.

BRIEF DESCRIPTION OF THE DRAWINGS

The present invention will be described with reference to the accompanying drawings in which:

FIG. 9A is an enlarged cross-sectional view of a principal portion;

FIG. 9B is an enlarged cross-sectional view of a principal portion;

FIG. 11 is an enlarged cross-sectional view of a principal portion;

FIG. 21A is a working explanatory view of a principal portion showing still another modification of the third preferred embodiment;

FIG. 21B is a working explanatory view of a principal portion showing still another modification of the third preferred embodiment;

DESCRIPTION OF THE PREFERRED EMBODIMENTS

Preferred embodiments of the present invention will now be described with reference to the accompanying drawings.

FIG. 1 through FIG. 5 show a first preferred embodiment of a rotation shaft seal relating to the present invention, which is used for a compressor of air conditioner for automobiles in which a high pressure cooling medium (such as $CO_2$) works on a fluid storing chamber 33 side.

That is to say, this rotation shaft seal is disposed between a housing 31 such as a case of the compressor and a rotation shaft 32 (on its peripheral face) to seal fluid such as high pressure cooling medium.

Figure 1:
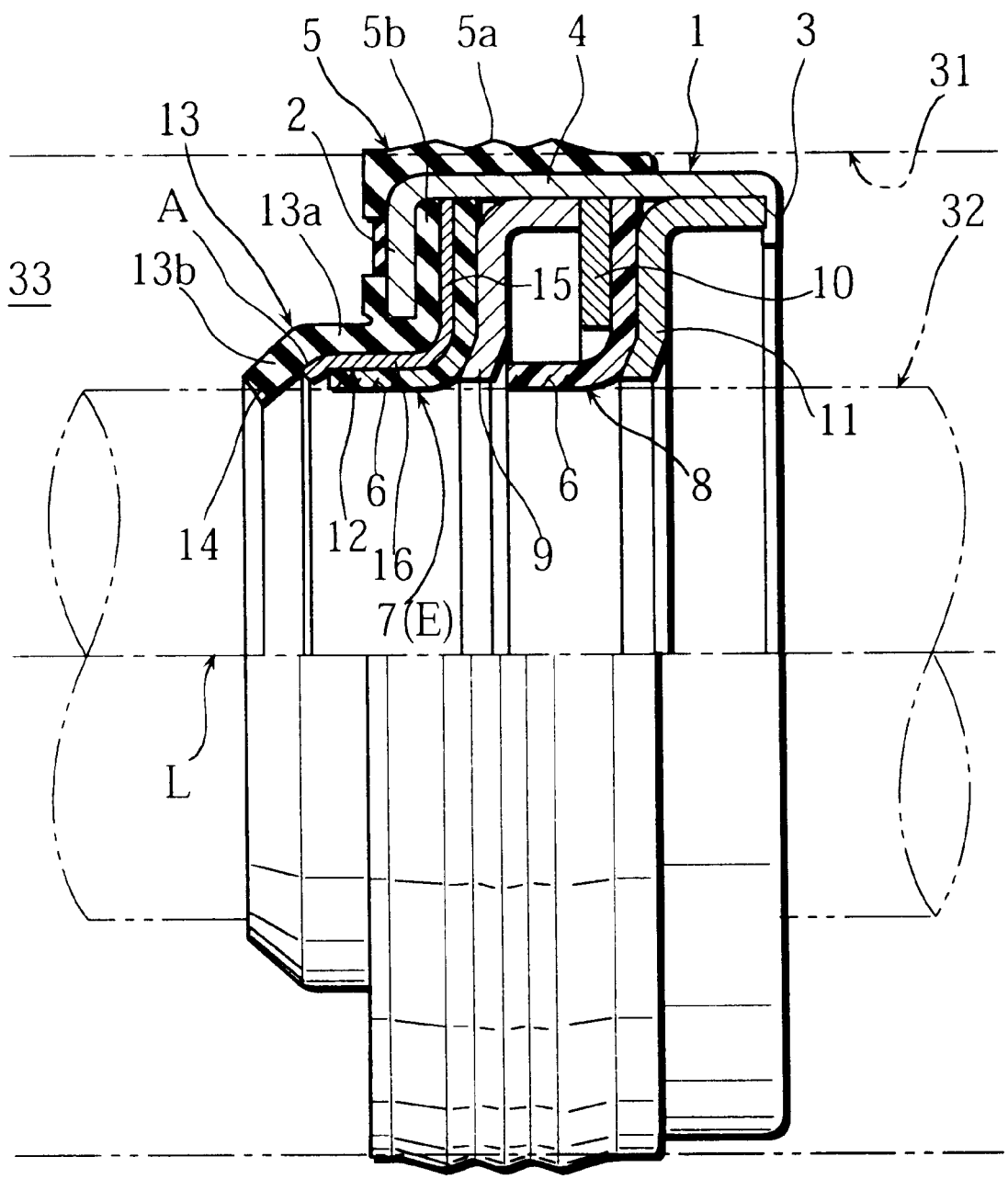
FIG. 1 is a half front view showing a first preferred embodiment of the present invention.

To explain the construction concretely, as shown in FIG. 1, the shaft seal is composed of an outer case 1 made of metal having inner brim portions 2 and 3, a seal member 5 made of rubber fixed to and unified with a peripheral face of a cylinder portion 4 of the outer case 1 and both sides of the inner brim portion 2 by adhesion, welding, baking, etc., a seal element E, a first inner case 9, a washer 10, a second inner case 11, and a supporting metal 12. And, in FIG. 1, the seal element E is composed of a first seal element 7 and a second seal element 8 having spiral grooves 6.

The seal member 5 made of rubber is composed of a cylindrical cover portion 5a of which peripheral face is formed to be undulate (in a free state) to elastically contact an inner peripheral face of the housing 31 for seal working, an inner brim cover portion 5b of which cross section is U-shaped covering both sides of the inner brim portion 2, and a lip portion 13 protruding from an inner side of the inner brim cover portion 5b of which cross section is U-shaped to the fluid storing chamber 33 side.

The lip portion 13 is composed of a short cylinder portion 13a, and a lip end portion 13b which diminishes in diameter gradually to the fluid storing chamber side. And, the lip portion 13 of approximately uniform thickness has a configuration bent in cross section (as shown in FIG. 1). A tip end portion 14 of the lip end portion 13b, linearly contacts the peripheral face of the rotation shaft 32 to seal in an attached (used) state.

The supporting metal 12 is disposed between the first seal element 7 and the seal member 5 made of rubber as to adhere to a side portion opposite to the fluid storing chamber 33 or an inner portion of the inner brim cover portion 5b of the seal member 5, the short cylinder portion 13a, and a the lip end portion 13b.

As shown in FIG. 1 and FIG. 2, the lip end portion 13b has an inclination angle of 10° to 45° to an axis L of the rotation shaft 32, and the supporting metal 12, as to correspond to the lip end portion 13b, has a slope receiving face A on its end as to have an inclination angle θ of 10° to 45° to the axis L.

Concretely, the supporting metal 12, of which cross section is approximately L-shaped, is composed of a flat board portion 15 at right angles with the axis L, and a cylinder portion 16 of short cylinder of which center is the axis L. An end portion 16a (on the fluid storing chamber 33 side) of the cylinder portion 16 is bent with the above inclination angle θ at a bent portion 17 as to diminish in diameter gradually to the end, and a peripheral face of the end portion 16a forms the former-mentioned slope receiving face A.

The bent portion 17 corresponds and tightly fits to the short cylinder portion 13a of the seal member 5 and a bent inner corner of the lip end portion 13b. And, as shown in FIG. 2B, it is preferable to form an R-shaped chamfer 20 on an end corner portion of the slope receiving face A of the supporting metal 12. That is to say, an end corner portion of the supporting metal 12 is effectively prevented from biting into the lip end portion 13b of the lip portion 13 to cause fissures in the lip end portion 13b.

And, as shown in FIG. 1, the outer case 1 is unified with the seal member 5 of rubber by adhesion, etc. beforehand. The supporting metal 12, the first seal element 7, the first inner case 9, the washer 10, the second seal element 8, and the second inner case 11 are serially fitted to the outer case 1 in a straight state (a cylindrical state) in which the inner brim portion 3 is not formed. Then, the inner brim portion 3 is formed by caulking and the all parts are unified.

The supporting metal 12, the first inner case 9, the second inner case 11, the washer 10, and the outer case 1 are made of metal such as steel. The first seal element 7 and the second seal element 8 are made of fluororesin such as PTFE. Further, the seal member 5 is, considering cooling medium resistance, made of HNBR of which JIS hardness is preferably set to be 87 to 96 (by composition of HNBR) to prevent deformation when the seal receives pressure. The seal member is greatly deformed when the JIS hardness is lower than 87, and slightly poor in elasticity when the JIS hardness is higher than 96.

Although sealing function is similar to that of the former-described conventional example, the lip end portion 13b is received (supported) by the slope receiving face A of the supporting metal 12 from a reverse side (inner side) and prevented from being deformed when pressure P works on the lip end portion 13b on the fluid storing chamber 33 side (as shown in FIG. 2), and good sealability of the lip end portion 13b is kept under high pressure.

Figure 3:
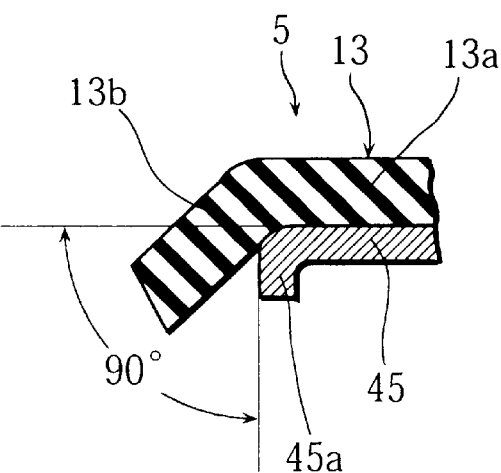
FIG. 3 is an enlarged cross-sectional view showing a comparison example.

FIG. 3 shows a comparison example proposed in conventional oil seals, in which a backup ring 45 is applied to holding of a lip portion 13 of a seal member 5 of rubber, disclosed by Japanese Utility Model Publication No. 2-47311. That is to say, although the backup ring 45 can backup (hold) a short cylinder portion 13a of the lip portion 13, is not useful for prevention of deformation when the lip end portion receives pressure because an end 45a of the backup ring 45 is bent for 90° and extremely short.

In short, in the present invention, the slope receiving face A of which inclination angle θ of $10° \leq \theta \leq 45°$ to the axis L is formed on the supporting metal 12 to approximately correspond to the inclination angle of the lip end portion 13b for holding (supporting) the lip end portion 13b certainly from the reverse (back) side, and deformation in pressure reception (refer to marks P) is prevented. The shaft seal demonstrates excellent sealability by keeping the inclination angle of the lip end portion 13b to be 10° to 45°.

Figure 4:
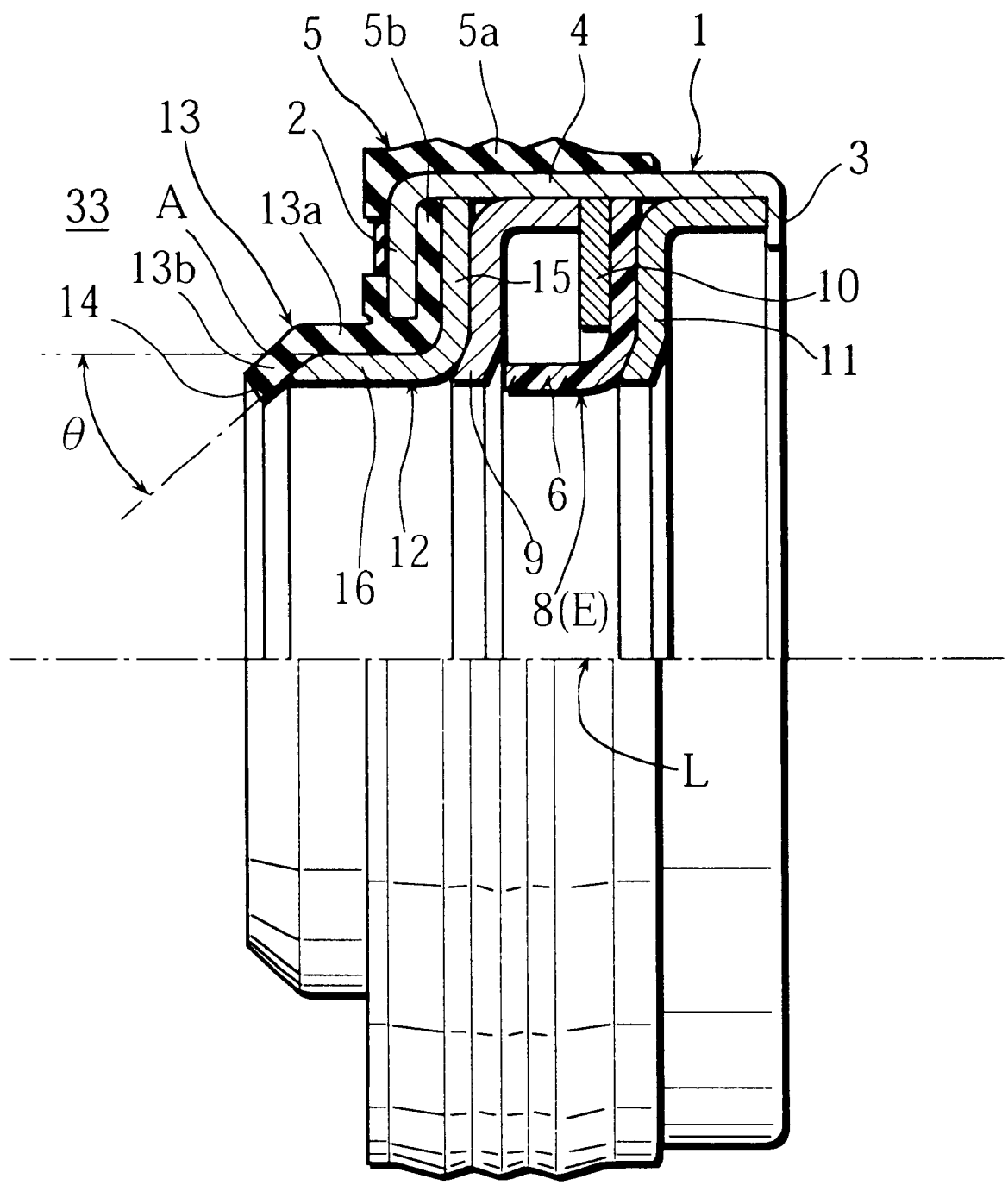
FIG. 4 is a half front view showing a modification of the first preferred embodiment.
Figure 5:
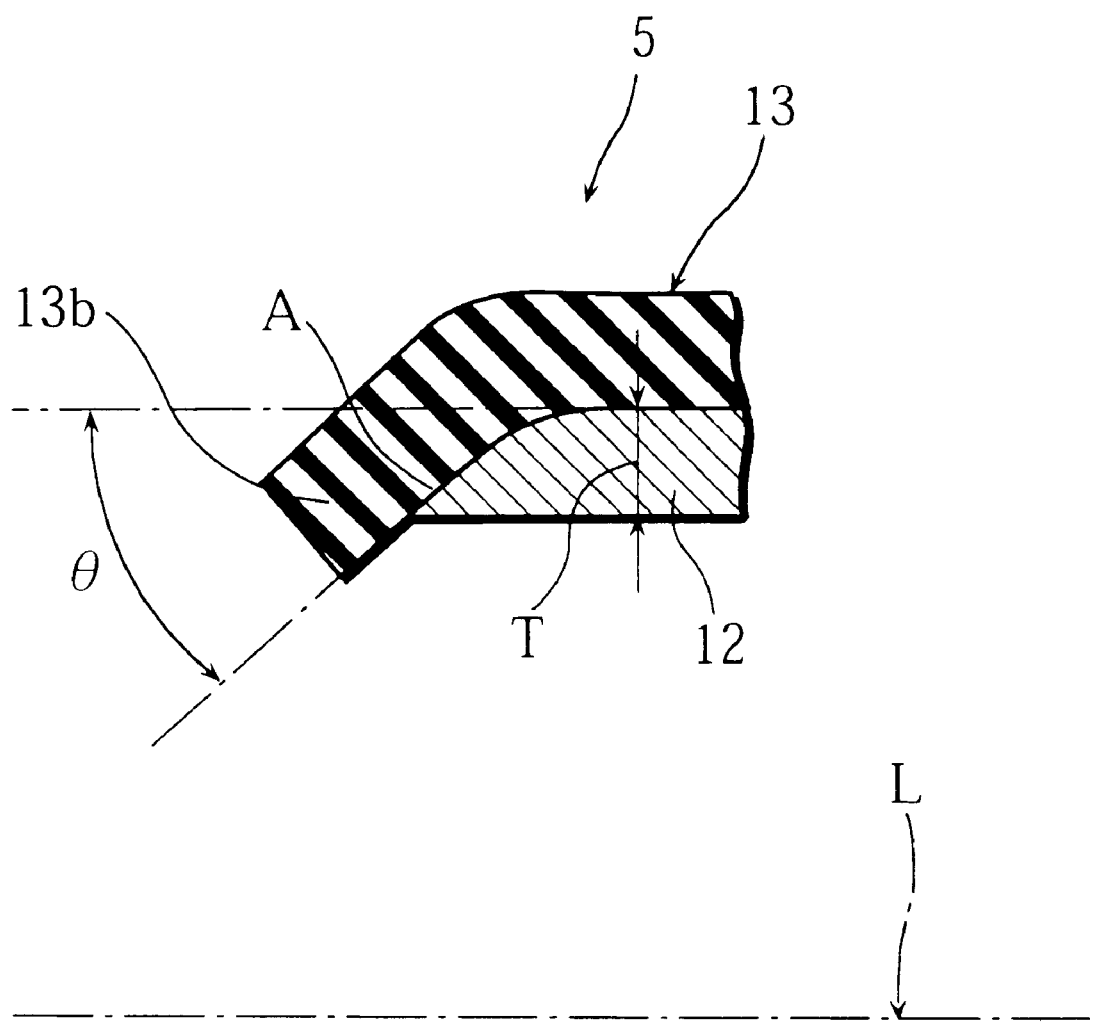
FIG. 5 is an enlarged cross-sectional view of a principal portion.

Next, FIG. 4 and FIG. 5 show a modification of the first preferred embodiment of the present invention. As clearly shown in comparison with FIG. 1 and FIG. 2, the modification is different in following construction.

That is to say, the first seal element 7 in FIG. 1 is omitted, the seal element E is composed exclusively of the second seal element 8, and the supporting metal 12 has a thickness dimension T enough to compensate the lack of the first seal element 7. And, the slope receiving face A is an end face of the supporting metal 12 (from which the bent portion 17 in FIG. 1 is omitted) made as to tightly fit to and support the reverse face (back face) side of the lip portion 13 of the seal member 5.

The inclination angle θ of the slope receiving face A with the axis L of the rotation shaft is set within the range of the above-described first preferred embodiment. Explanation of other parts indicated with same marks as in the first preferred embodiment is omitted, since they are similarly constructed as in the first preferred embodiment.

Next, examples will be described.

Figure 2A:
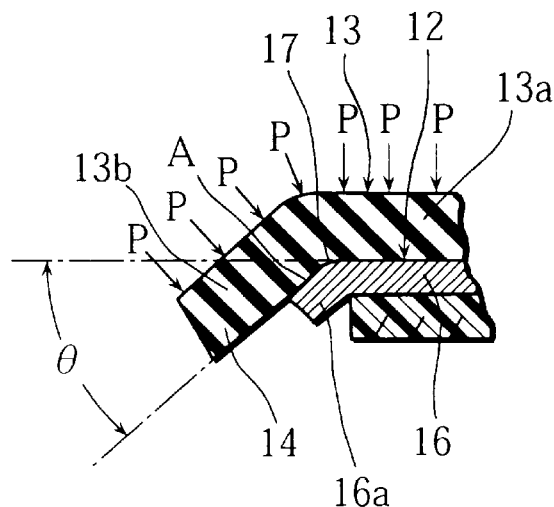
FIG. 2A is an enlarged cross-sectional view of a principal portion.
Figure 2B:
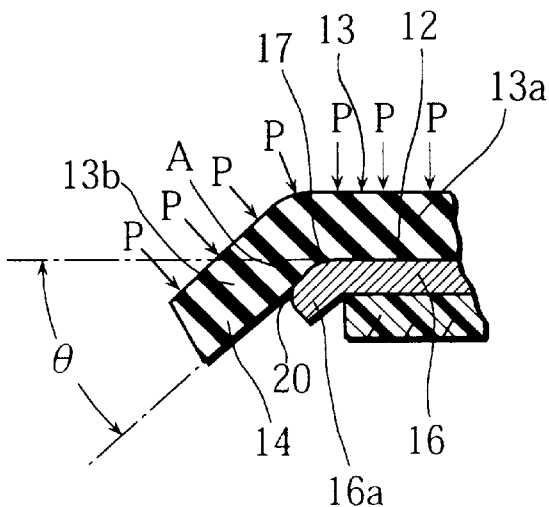
FIG. 2B is an enlarged cross-sectional view of a principal portion.

A shaft seal having the construction shown in FIG. 1 and FIG. 2B (example 1) and a shaft seal having the construction shown in FIG. 1 and FIG. 2A (example 2) were made and tested for sealability under the following test condition.

Test condition:
(1) Sealed Fluid: (refrigerating machine oil+$CO_2$)
(2) Sealing Pressure: 2.45 MPa (25 kgf/cm$^2$)
(3) Rotation Speed: 3.74 m/s
(4) Temperature: 60° C.

The result of the above test is shown in following Table 1.

TABLE 1

RESULT OF THE TEST

| | Time of the Leakage (h) | Operation Time (h) | Total Amount of Leakage (g) |
|---|---|---|---|
| EXAMPLE 1 | — | 500 | 0 |
| EXAMPLE 2 | 415 | 438 | 1.36 |
| CONVENTIONAL EXAMPLE | 70.5 | 120 | 1.23 |

The above Table 1 shows that the supporting metal 12 prevents deformation of the lip end portion 13b, increase of contact area of the seal with the rotation shaft 32, and, heat and abrasion. And, Table 1 also shows that time until the leakage (life time of the seal) Is further extended by the R-shaped chamfer 20 as in FIG. 2B.

Next, a second preferred-embodiment of the present invention is shown in FIG. 6 through FIG. 12. As clearly shown in comparison with the first preferred embodiment shown in FIG. 1 through FIG. 5, the second preferred embodiment is different in following construction. Explanation of parts indicated with same marks as in the first preferred embodiment is omitted, since they are similarly constructed as in the first preferred embodiment.

Figure 6:
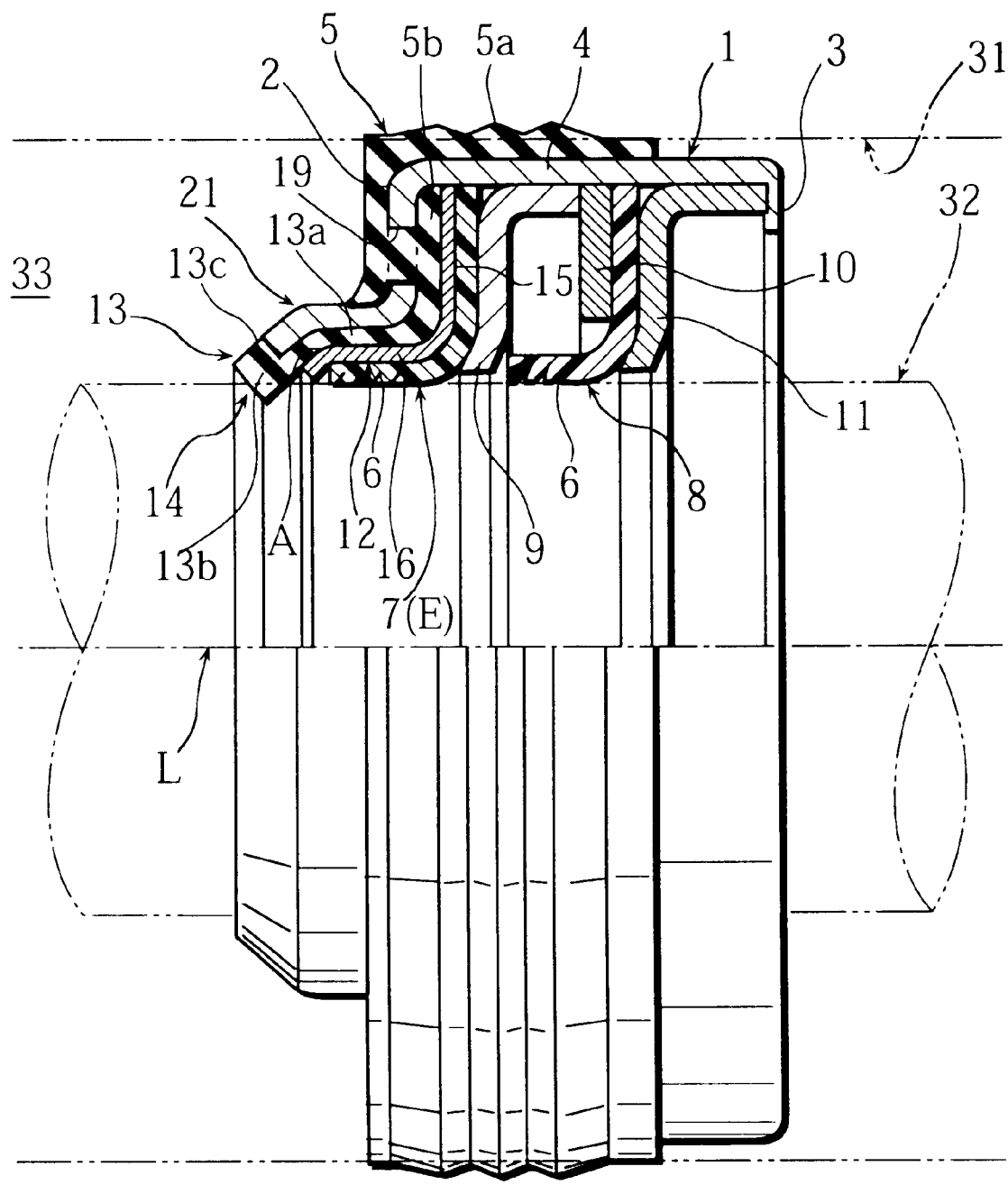
FIG. 6 is a half front view showing a second preferred embodiment of the present invention.
Figure 7A:
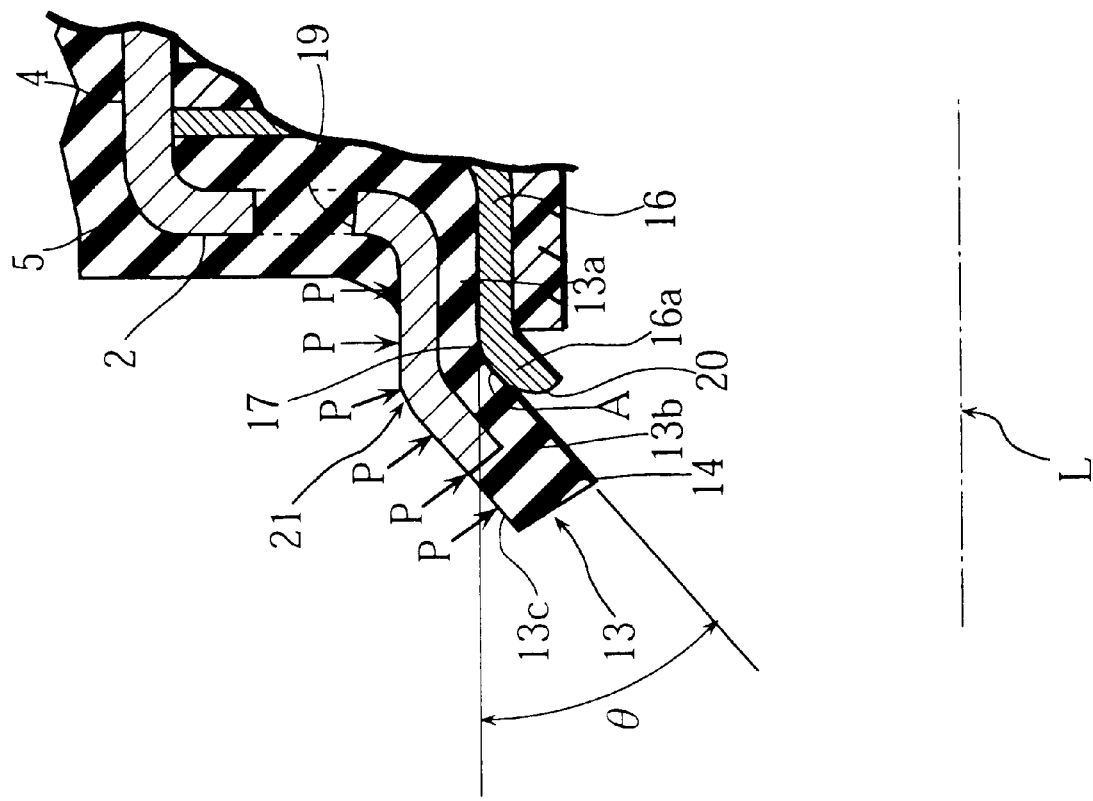
FIG. 7A is an enlarged cross-sectional view of a principal portion.
Figure 7B:
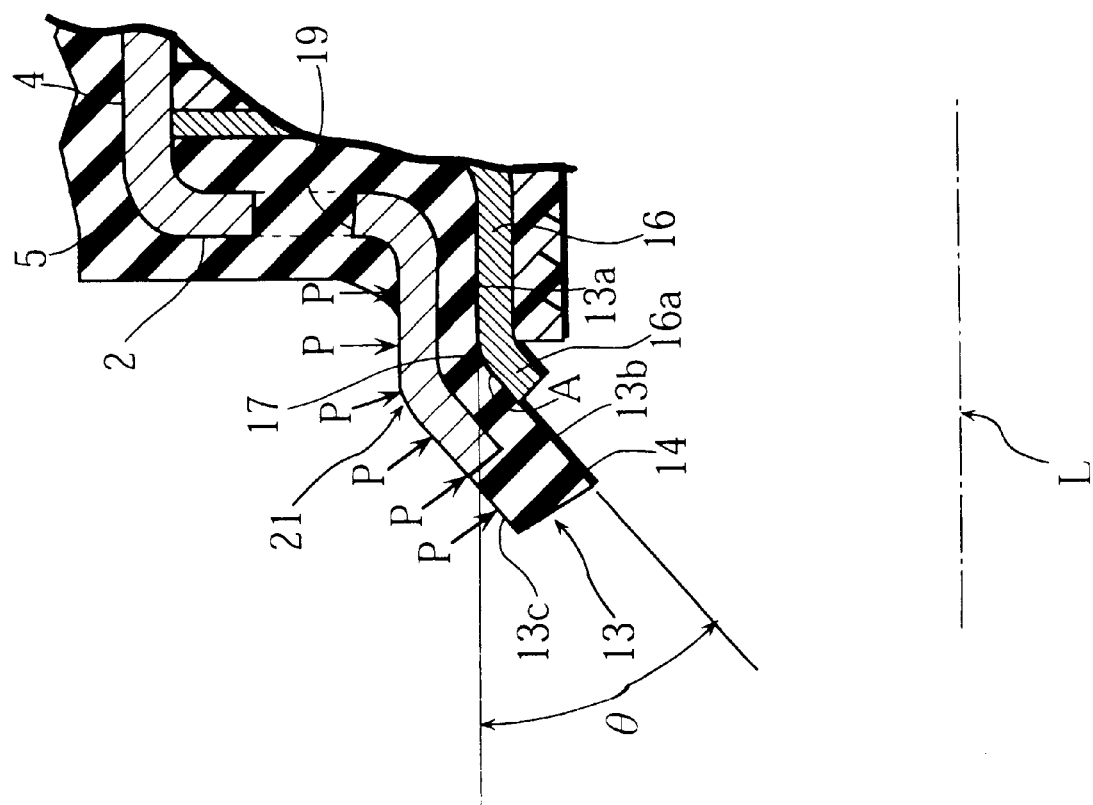
FIG. 7B is an enlarged cross-sectional view of a principal portion.

That is to say, as shown in FIG. 6, a reinforcing cover metal 21 is formed unitedly with the inner brim portion 2 of the outer case 1. To describe concretely, the supporting metal 12 is disposed between the first seal element 7 and the seal member 5 of rubber. A part from the inner peripheral face of the lip end portion 13b to a back face of the inner brim cover portion (standing portion) 5b (standing in a direction at right angles with the rotation shaft 32) through the short cylinder portion 13a, is held by the supporting metal 12 of ring, a part from the peripheral face of the lip end portion 13b to the peripheral face of the short cylinder portion 13a is covered with the reinforcing cover metal 21, and the lip end portion 13b (leaving the tip end portion 14) is sandwiched between the supporting metal 12 and the reinforcing cover metal 21.

As shown in FIG. 6 and FIG. 7, the lip end portion 13b has an inclination angle of 10° to 45° to the axis L of the rotation shaft 32, and, corresponding to the inclination angle, the supporting metal 12 has the slope receiving face A has an inclination angle θ of 10° to 45° to the axis L.

The reinforcing cover metal 21 covering the outer face of the lip end portion 13b, as described above, is formed unitedly with the inner brim portion 2 of the outer case made of metal. That is to say, as in FIG. 7A and FIG. 7B, the reinforcing cover metal 21 is unitedly attached to the outer face of the lip end portion 13b with adhesion or baking leaving the tip end portion 14.

High pressure P is prevented from working directly on the whole lip end portion 13b by the reinforcing cover metal 21. And, high sealability is secured by cooperation of the reinforcing cover metal 21 with the supporting metal 12 to reduce the deformation of the lip end portion 13b when the pressure in the fluid storing chamber 33 is relatively high (3 to 10 MPa, for example).

In further concrete description, the reinforcing cover metal 21 does not cover the whole of the lip end portion 13b, an end of the reinforcing cover metal 21 is extended to a position leaving the tip end portion 14 of the lip end portion 13b which linearly contacts the rotation shaft 32. In other words, an exposed portion 13c not covered by the reinforcing cover metal 21 is on the peripheral face of the lip end portion 13b closer to the tip end side than the position, the high pressure P works directly only on the exposed portion 13c, and appropriate linear contact state is formed (by cooperation with the supporting metal 12) between the tip end portion of the lip end portion 13b and the rotation shaft 32 thereby to secure the high sealability.

The inner peripheral face of a root portion (near a bent portion 17) of the lip end portion 13b having the exposed portion 13c on the outer face is supported by the slope receiving face A of the supporting metal 12 as described above, the root portion of the lip end portion 13b sandwiched between the supporting metal 12 and the reinforcing cover metal 21 is sufficiently reinforced on both of inner and outer sides thereby. Therefore, the whole lip end portion 13b is not greatly deformed when the high pressure P works, area contact state of excessive pressure between the lip end portion 13b and the rotation shaft 32 is prevented, and early abrasion of the lip portion 13 is prevented thereby.

The supporting metal 12, the first inner case 9, the second inner case 11, the washer 10, the reinforcing cover metal 21, and the outer case 1 are made of metal such as steel, and, the first seal element 7 and the second seal element 8 are made of fluororesin such as PTFE, further, the seal member 5 is, considering cooling medium resistance, made of HNBR of which JIS hardness is preferably set to be 87 to 96 (by composition of HNBR) to prevent deformation when the seal receives pressure. The seal member is greatly deformed when the JIS hardness is lower than 87, and slightly poor in elasticity when the JIS hardness is higher than 96.

To make this kind of pressure-resisting rotation shaft seal, as shown in FIG. 6, the supporting metal 12, the first seal element 7, the first inner case 9, the washer 10, the second seal element 8, and the second inner case 11 are serially fitted to the outer case 1 unified with the seal member 5 of rubber by adhesion, etc. beforehand in a straight state (a cylindrical state) in which (the reinforcing cover metal 21 and) the inner brim portion 3 of the outer case 1 are not formed. And then, the inner brim portion 3 is bent and formed by caulking and the all parts are unified.

Especially, the unification with the seal member 5 of rubber is made stronger by forming an opening hole 19 on the inner brim portion 2 of the outer case 1 beforehand. Further, when preliminary formed rubber is formed with the inner brim portion 2, inside of the inner brim cover portion 5b (standing portion) is easily filled with the preliminary formed rubber through the opening hole 19.

Figure 8:
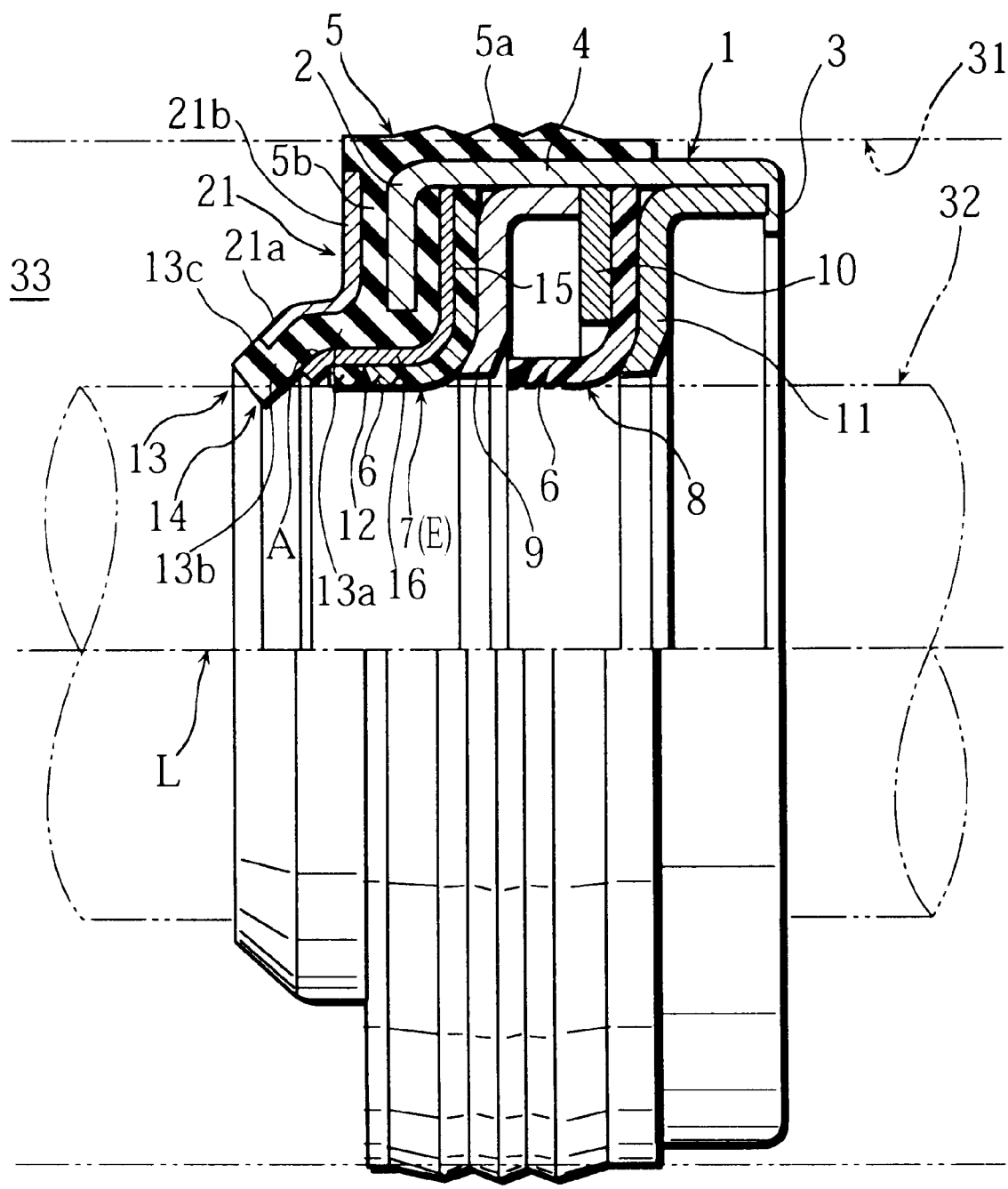
FIG. 8 is a half front view showing a modification of the second preferred embodiment.

Next, FIG. 8 and FIG. 9A show a modification of the second preferred embodiment of the present invention. In this case, the reinforcing cover metal 21, covering a part from the peripheral face of the lip end portion 13b to the standing portion (the inner brim cover portion) 5b through the peripheral face of the short cylinder portion 13a, is formed separately from the outer case 1, and a part of the seal member 5 is disposed between the reinforcing cover metal 21 and the inner brim portion 2 of the outer case 1. And, in this case, the reinforcing cover metal 21, in which an end portion 21a covering the peripheral face of the lip end portion 13b and the short cylinder portion 13a, and a base portion 21b covering the standing portion 5b are uniformly formed, has an approximately L-shaped or J-shaped cross section.

In this case too, the exposed portion 13c not covered with the reinforcing cover metal 21 is formed on the peripheral face of the end of the lip end portion 13b, and the tip end portion 14 of the lip portion corresponding to the exposed portion 13c becomes linear contact state of appropriate pressure with the rotation shaft 32 as the second preferred embodiment. And, as shown in FIG. 9B, the R-shaped chamfer 20 is preferably formed on an end corner portion of the slope receiving face A of the supporting metal 12 to effectively prevent the end corner portion of the supporting metal 12 from biting into the lip end portion 13b to cause fissures in the lip end portion 13b as the first preferred embodiment.

Figure 10:
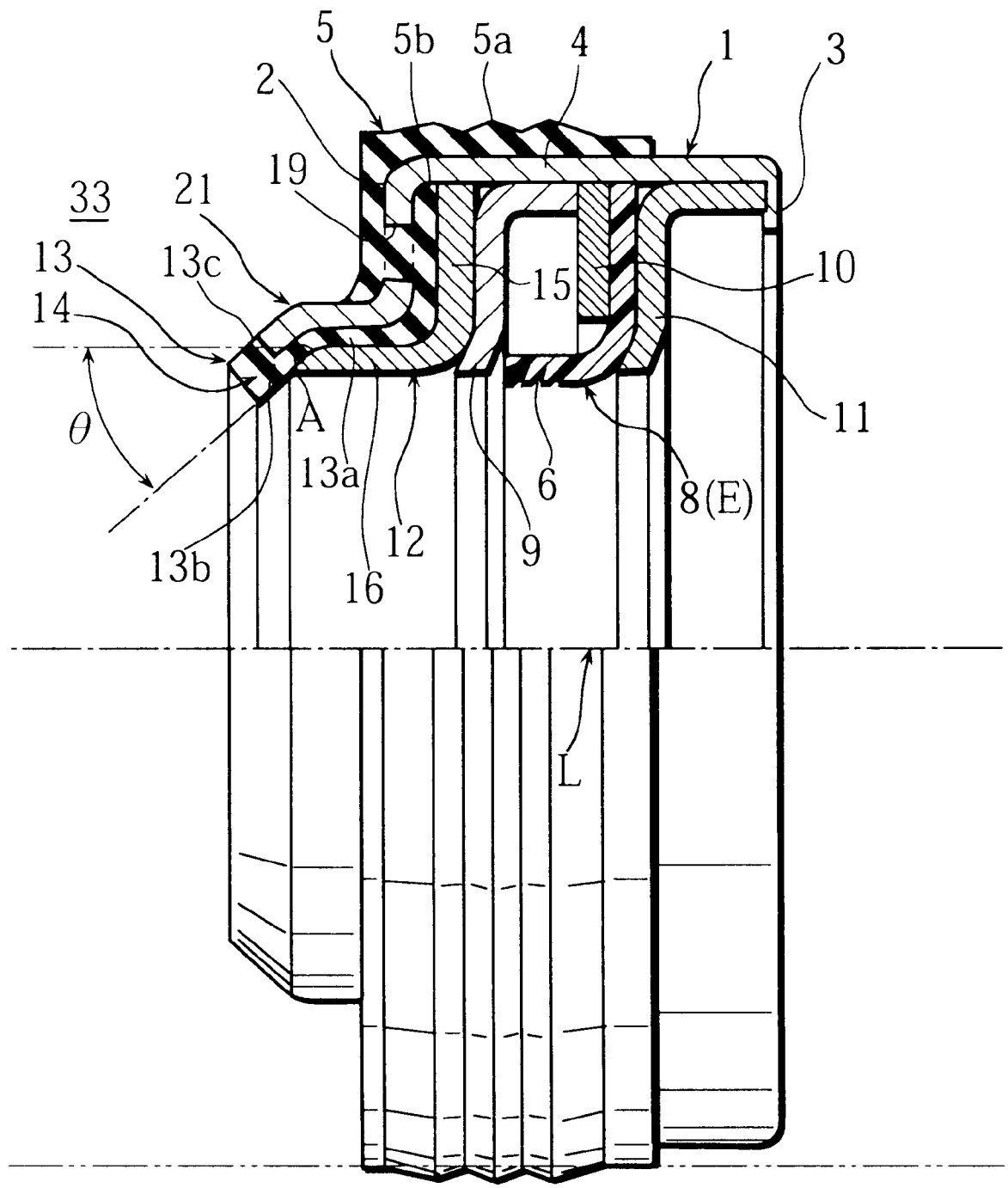
FIG. 10 is a half front view showing another modification of the second preferred embodiment.

Further, FIG. 10 and FIG. 11 show another modification of the second preferred embodiment of the present invention. In this case, the first seal element 7 is omitted, the seal element E is composed exclusively of the second seal element 8, and the supporting metal 12 has a thickness dimension T enough to compensate the lack of the first seal element 7. And, the slope receiving face A is an end face of the supporting metal 12 (from which the bent portion 17, etc. in FIG. 6 are omitted) made as to tightly fit to and support the reverse face (back face) side of the lip portion 13 of the seal member 5.

In this case, similar working effect to the embodiment shown in FIG. 6 and FIG. 7 is obtained. The inclination angle θ of the slope receiving face A with the axis L of the rotation shaft is set within the range of the embodiment shown in FIG. 6 and FIG. 7. Explanation of same parts indicated with same marks is omitted. And, although not shown in FIGS., the embodiment shown in FIG. 10 and FIG. 11 may be combined with the embodiment shown in FIG. 8 and FIG. 9.

Figure 12A:
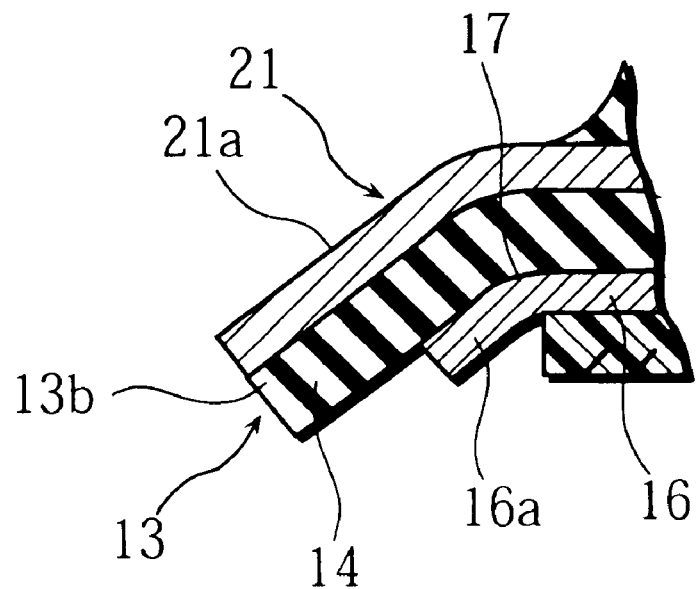
FIG. 12A is a cross-sectional view of a principal portion showing a modification of a reinforcing cover metal.
Figure 12B:
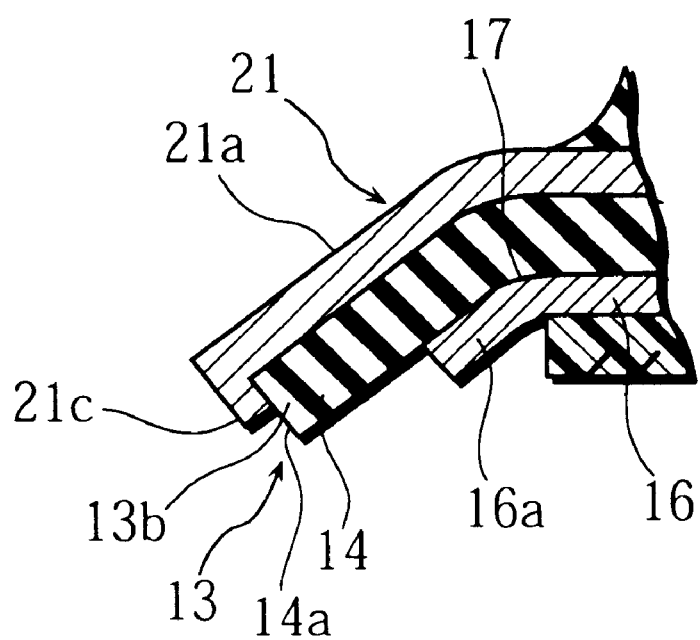
FIG. 12B is a cross-sectional view of a principal portion showing a modification of a reinforcing cover metal.

And, FIG. 12A and FIG. 12B show modifications of the reinforcing cover metal 21. In a modification shown in FIG. 12A, the end portion 21*a* of the reinforcing cover metal 21 is extended to the tip end portion 14 of the lip portion 13. And, in a modification shown in FIG. 12B, a tip of the end portion 21*a* of the reinforcing cover metal 21 is bent to the lip portion 13 side (forming a bent portion 21*c*), and the bent portion 21*c* hitches onto the tip end face 14*a* of the tip end portion 14 of the lip portion 13. By these compositions, exfoliation of the reinforcing cover metal 21 from the lip portion 13 is prevented. And, the modifications in FIG. 12A and FIG. 12B may be combined with the former-described preferred embodiments.

And, the construction members such as the outer case, the seal element, the supporting metal, the reinforcing cover metal, etc. are not restricted to the embodiments described above. Each of the above construction members may be modified in design or improved corresponding to service condition, etc., and the present invention can be applied to any configurations and combinations of the construction members as long as the inner peripheral face of the lip end portion of the sealing member of rubber is held by the supporting metal, the peripheral face of the lip end portion is covered with the reinforcing cover metal, and the lip end portion is reinforced by the supporting metal and the reinforcing cover metal which sandwich the lip end portion.

Next, FIG. 13 through FIG. 23 show a third preferred embodiment of the rotation shaft seal relating to the present invention. As clearly shown in comparison with the above-described first and second preferred embodiments, the embodiment is different in following construction. Explanation of the members of the same marks is omitted because the members are similarly constructed as in the former embodiments.

Figure 13:
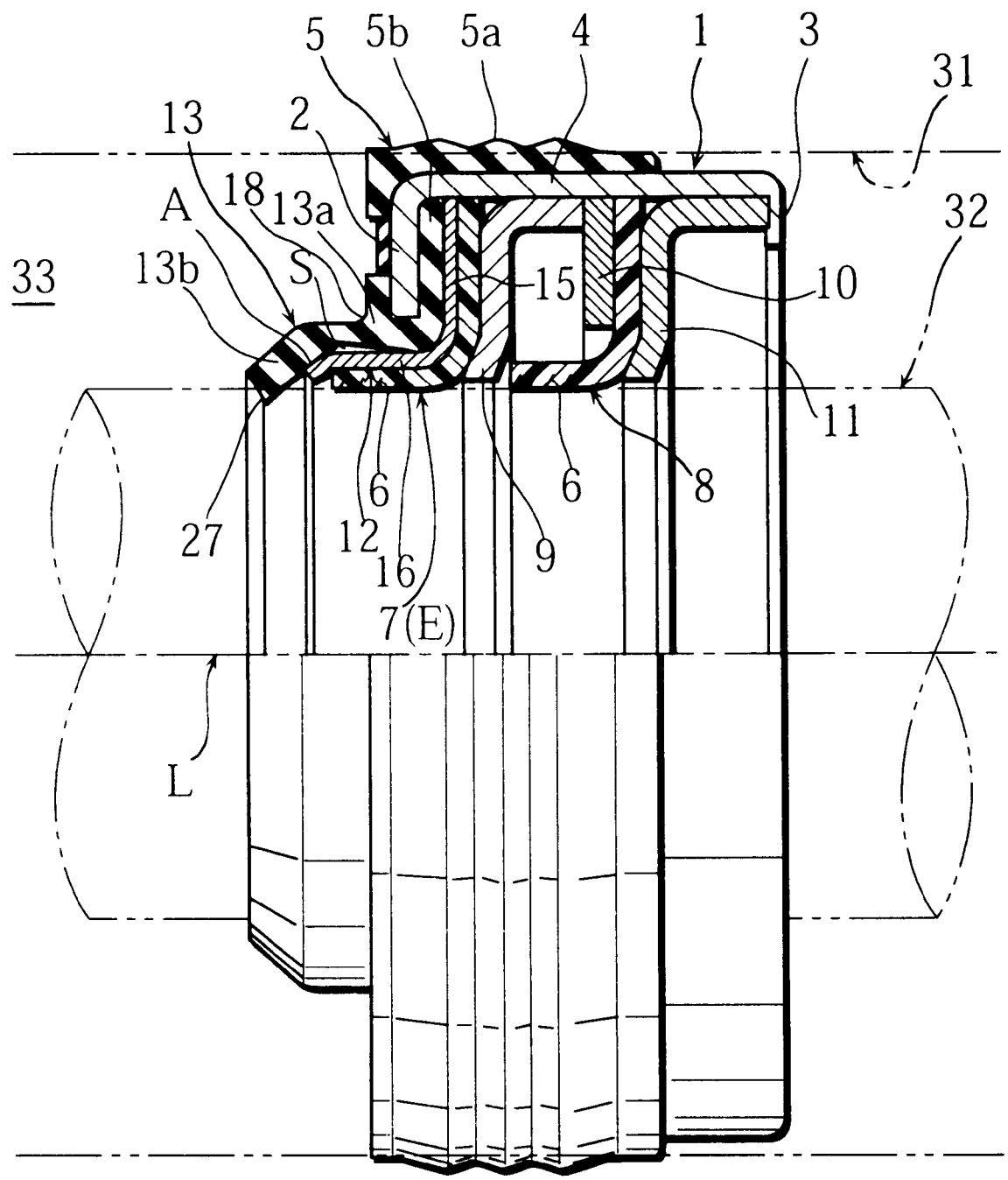
FIG. 13 is a half front view showing a third preferred embodiment of the present invention.

As shown in FIG. 13, a gap portion S is formed between the seal member 5 of rubber and the supporting metal 12 disposed as to support the back face of the seal member 5 of rubber. To describe concretely, the supporting metal 12 is disposed between the first seal element 7 and the seal member 5 as to partially fit to and hold the lip portion 13 with the gap portion S on an opposite part to the fluid storing portion of the inner brim cover portion 5*b* of the seal member 5, the short cylinder portion 13*a*, and the lip end portion 13*b*.

Figure 14A:
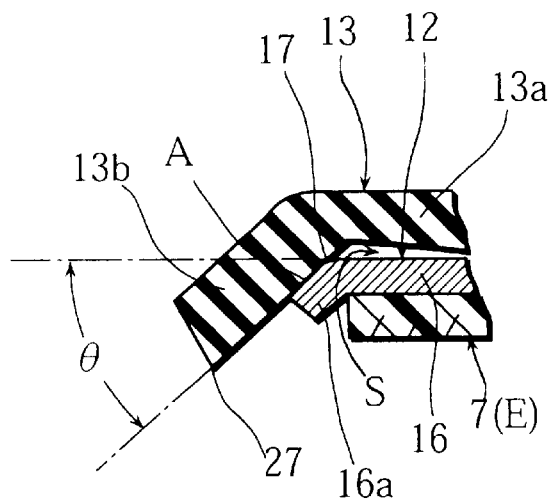
FIG. 14A an enlarged cross-sectional view of a principal portion.

As shown in FIG. 13 and FIG. 14, the lip end portion 13*b* has an inclination angle of 10° to 45° to the axis L of the rotation shaft 32, and, corresponding to the inclination angle, the supporting metal 12 has the slope receiving face A has an inclination angle θ of 10° to 45 ° to the axis L.

Concretely, the supporting metal 12, of which cross section is approximately L-shaped, is composed of a flat board portion 15 at right angles with the axis L, and a cylinder portion 16 of short cylinder of which center is the axis L. An end portion 16*a* (on the fluid storing chamber 33 side) of the cylinder portion 16 is bent with the above inclination angle θ at a bent portion 17 as to diminish in diameter gradually to the end, and a peripheral face of the end portion 16*a* forms the former-mentioned slope receiving face A.

The bent portion 17 tightly fits to an end side to the short cylinder portion 13*a* and a bent inner corner of the lip end portion 13*b*. That is to say, the cylinder portion 16 of the supporting portion 12, forming the gap portion S, does not fit to (hold) the short cylinder portion 13*a* of the lip portion 13 and a part of the lip end portion 13*b*, while the end portion 16*a* (the slope receiving face A) of the supporting metal 12 fits to (holds) the lip end portion 13*b*.

Figure 14B:
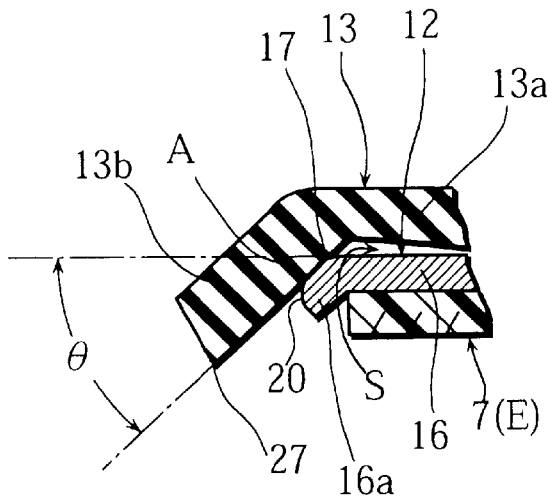
FIG. 14B is an enlarged cross-sectional view of a principal portion.

And, as shown in FIG. 14B, it is preferable to form an R-shaped chamfer 20 on an end corner portion of the slope receiving face A of the supporting portion 12. That is to say, in pressurizing (operation) state of the fluid storing chamber 33 (refer to FIG. 13), an end corner portion of the supporting metal 12 is effectively prevented from biting into the lip end portion 13*b* of the lip portion 13 to cause fissures in the lip end portion 13*b* when high pressure of the fluid works.

And, as shown in FIG. 13, the outer case 1 is unified with the seal member 5 of rubber by adhesion, etc. beforehand. The supporting metal 12, the first seal element 7, the first inner case 9, the washer 10, the second seal element 8, and the second inner case 11 are serially fitted to the outer case 1 in a straight state (a cylindrical state) in which the inner brim portion 3 is not formed. Then, the inner brim portion 3 is formed by caulking and the all parts are unified.

The supporting metal 12, the first inner case 9, the second inner case 11, the washer 10, and the outer case 1 are made of metal such as steel. The first seal element 7 and the second seal element 8 are made of fluororesin such as PTFE. Further, the seal member 5 is, considering cooling medium resistance, made of HNBR of which JIS hardness is preferably set to be 87 to 96 (by composition of HNBR) to prevent deformation when the seal receives pressure. The seal member is greatly deformed when the JIS hardness is lower than 87, and slightly poor in elasticity when the JIS hardness is higher than 96.

And, the seal member 5 of rubber, corresponding to pressure increase of the fluid storing chamber 33, elastically deforms mainly in a diminishing direction of the short cylinder portion 13*a* as to get into the gap portion S. In the third embodiment of the present invention, the lip end portion 13*b* is drawn in a parting direction from the rotation shaft 32 by utilizing the elastic deformation.

Figure 16A:
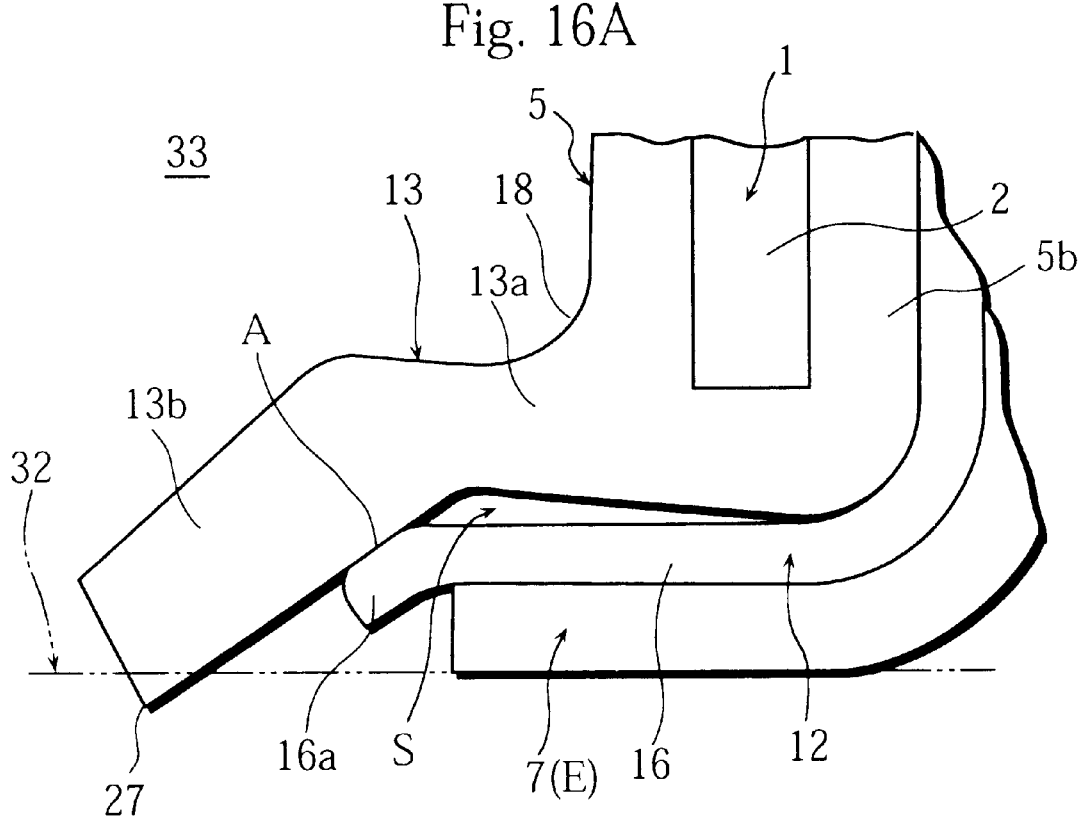
FIG. 16A is a working explanatory view of a principal portion.

To describe concretely, firstly, as shown in FIG. 16A, in the seal member 5 of rubber in non-attached state (free state) to the rotation shaft 32, the gap portion S is disposed between the seal member 5 of rubber (the lip portion 13) and the supporting metal 12, and the back face of the lip end portion 13*b* is held by the slope receiving face A of the supporting metal 12.

Figure 16B:
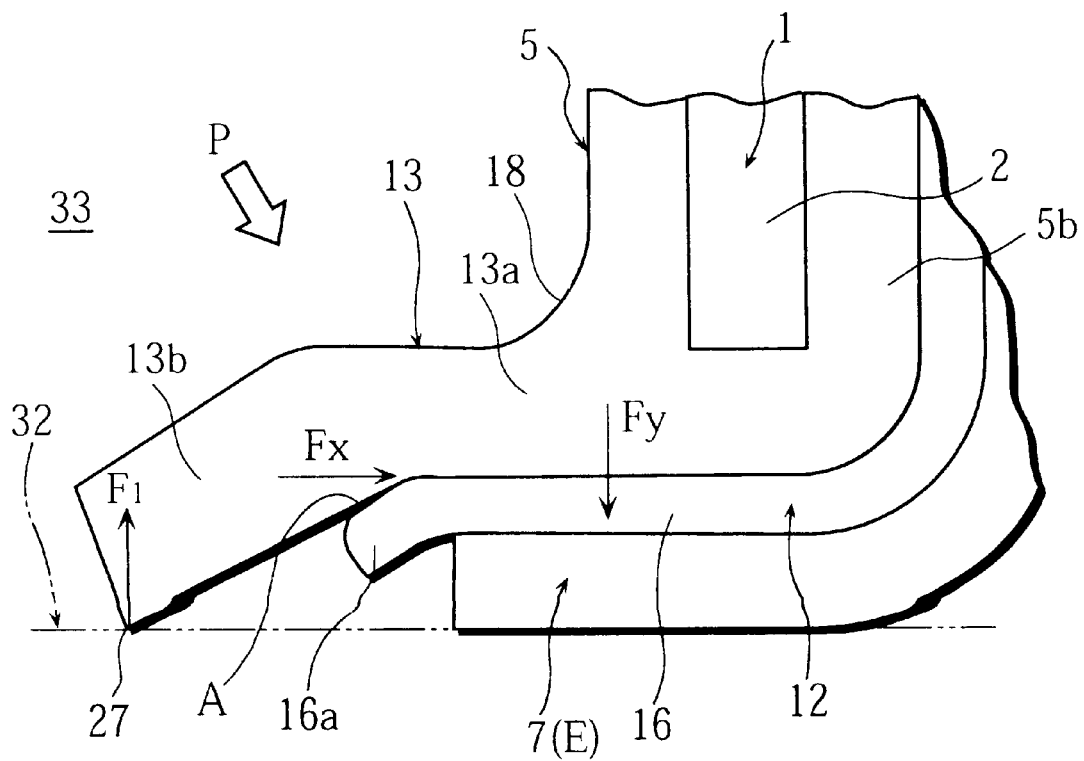
FIG. 16B is a working explanatory view of a principal portion.

And, as shown in FIG. 16B, the short cylinder portion 13*a* of the lip portion 13 elastically deforms as to get into the gap portion S when pressure P (of high-pressure fluid, etc.) works on the seal member 5 of rubber (the lip portion 13). That is to say, locomotion force $F_x$ for elastic deformation in the axis L direction of the rotation shaft 32 (refer to FIG. 13) and pressing force $F_y$ for elastic deformation in vertical direction to the axis L work on the lip portion 13.

In this case, the lip end portion 13*b* of the lip portion 13 is drawn in the parting direction from the rotation shaft 32 along the slope receiving face A by the locomotion force $F_x$. That is to say, tensile force $F_1$ works on an end corner portion 27 of the lip end portion 13*b* in the parting direction from the rotation shaft 32.

Figure 17A:
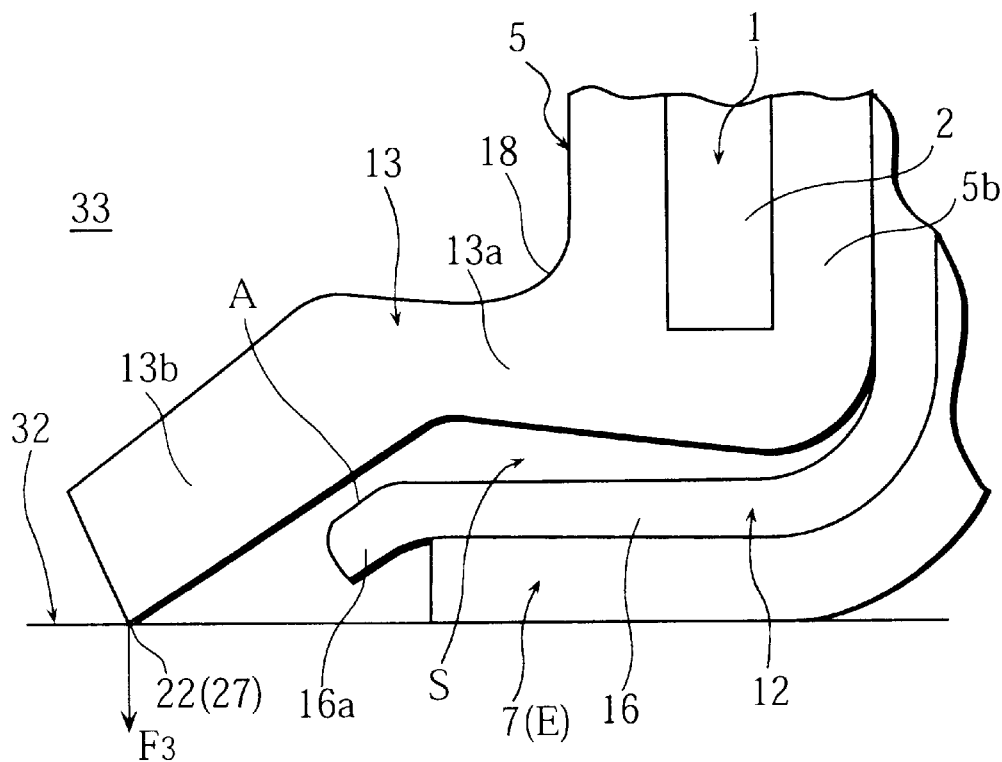
FIG. 17A is a working explanatory view of a principal portion.

And, when the seal member 5 of rubber is attached to the rotation shaft 32 and the fluid storing chamber 33 is not pressurized, as shown in FIG. 17A, the lip portion 13 parts from the slope receiving face A, the gap portion S is enlarged, and the elastically-pushed seal member 5 of rubber (the lip portion 13) linearly contact (the peripheral face of)

the rotation shaft 32. That is to say, tightening force $F_3$ generated by elasticity of rubber works on a contact portion 22 (an end corner portion 27) of the lip end portion 13*b* (with the rotation shaft 32) toward the rotation shaft 32.

Figure 17B:
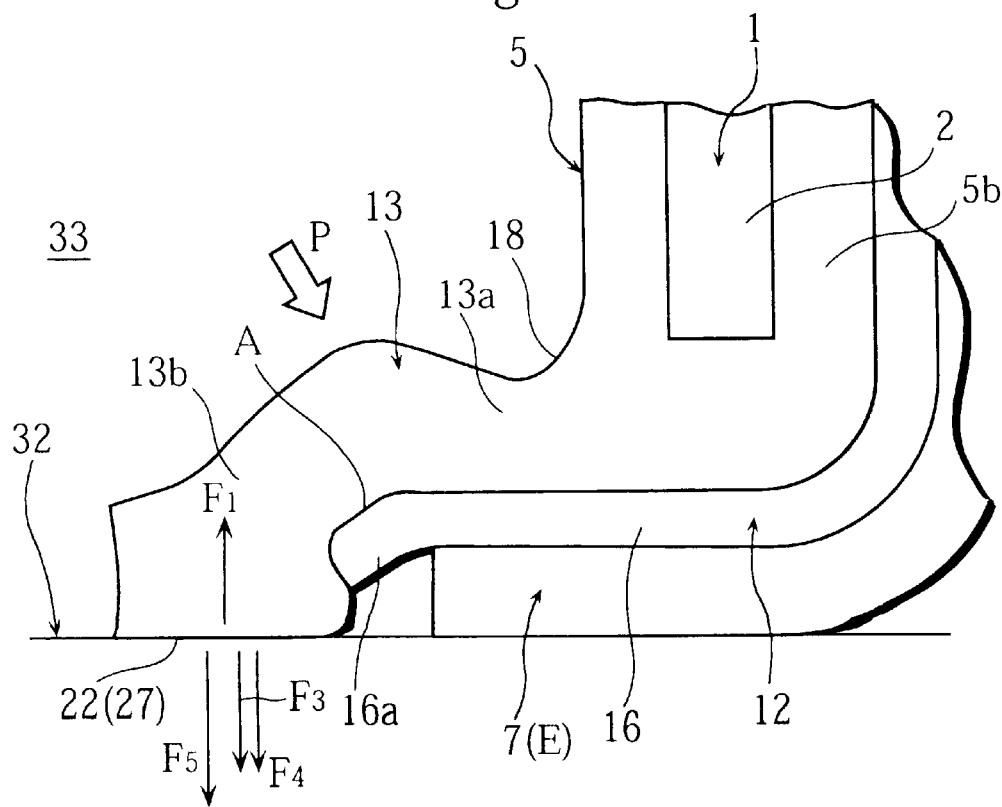
FIG. 17B is a working explanatory view of a principal portion.

And, as shown in FIG. 17B, in pressurized (operation) state of the fluid storing chamber 33, self-sealing force $F_4$ (generated by the pressurization), (the above-mentioned) tightening force $F_3$, and (the above-mentioned) tensile force $F_1$ work on the contact portion 22 (the end corner portion 27) of the lip end portion 13*b* toward the rotation shaft 32. That is to say, total force $F_5$ $(=F_3+F_4-F_1)$ works on the contact portion 22 (the end corner portion 27) of the lip end portion 13*b* toward the rotation shaft 32.

Figure 41:
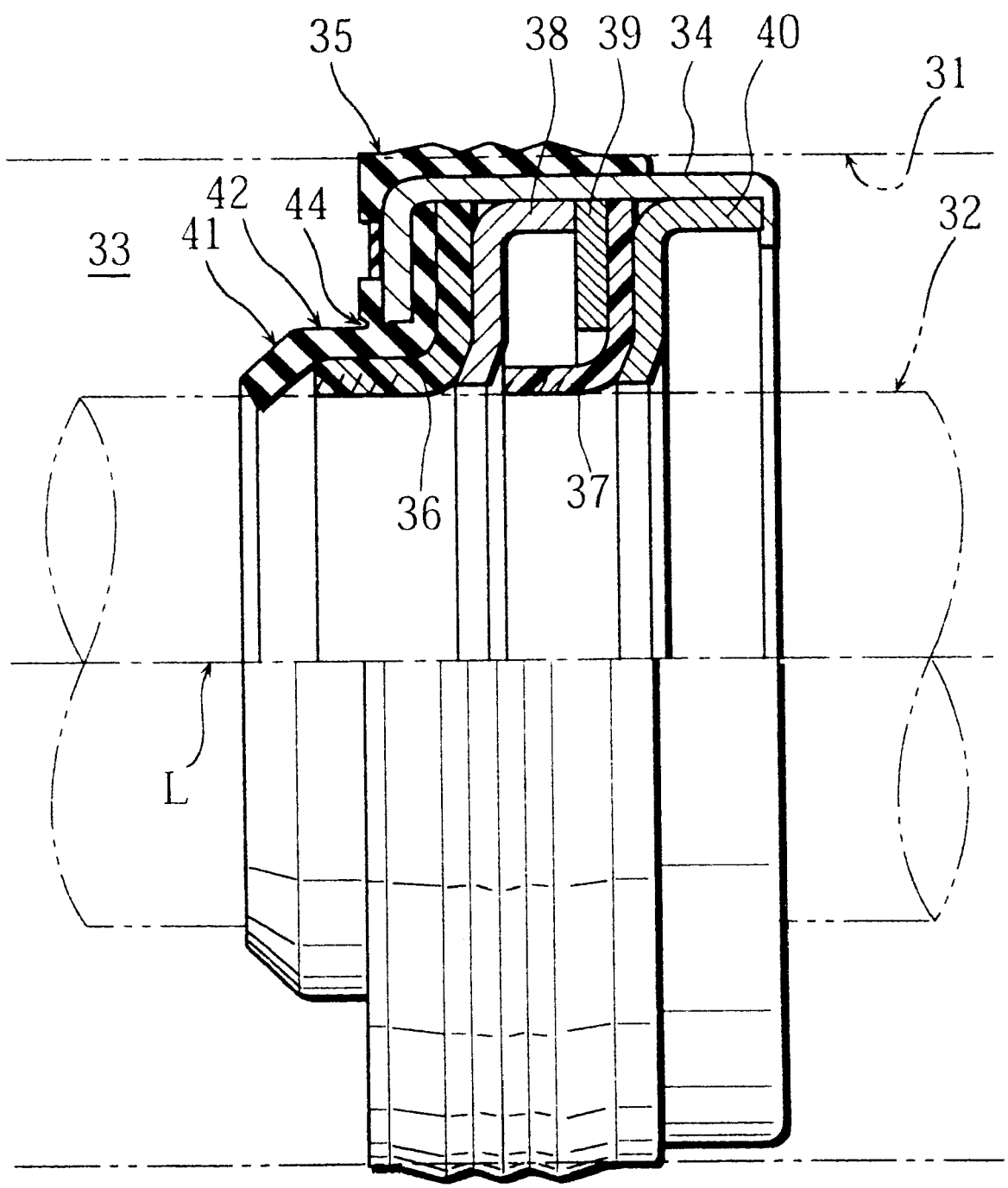
FIG. 41 is a half front view of a conventional example.

Therefore, in comparison with the case (in which the gap portion S does not exist in the non-attached state to the rotation shaft 32) shown in the conventional example (FIG. 41), force working on the rotation shaft 32 decreases (for the tensile force $F_1$), contact pressure of the contact portion 22 of the lip end portion 13*b* is reduced, and abrasion is reduced thereby.

Figure 42A:
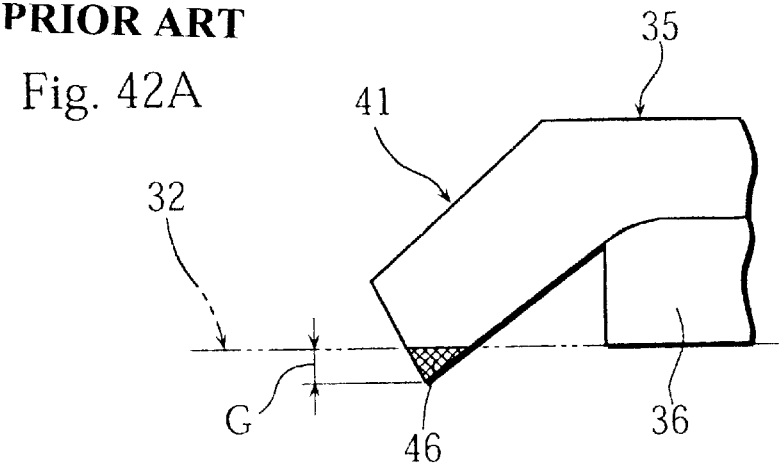
FIG. 42A is a working explanatory view of a principal portion of the conventional example.
Figure 42B:
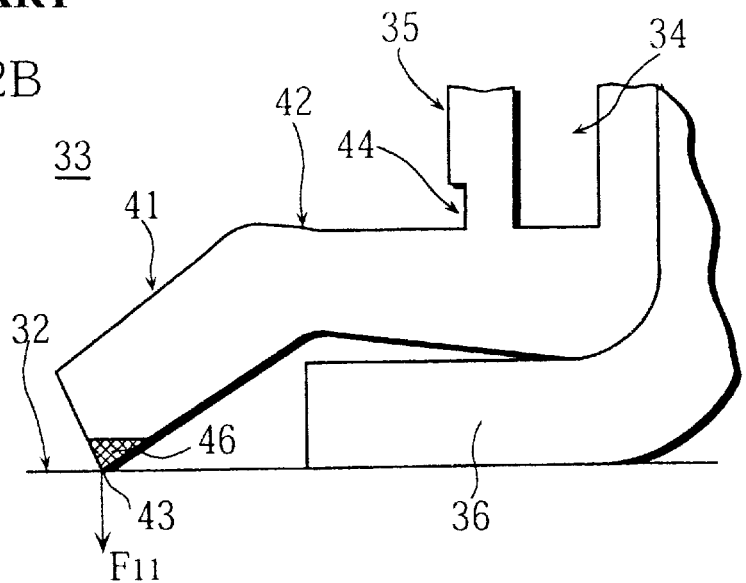
FIG. 42B is a working explanatory view of a principal portion of the conventional example.
Figure 42C:
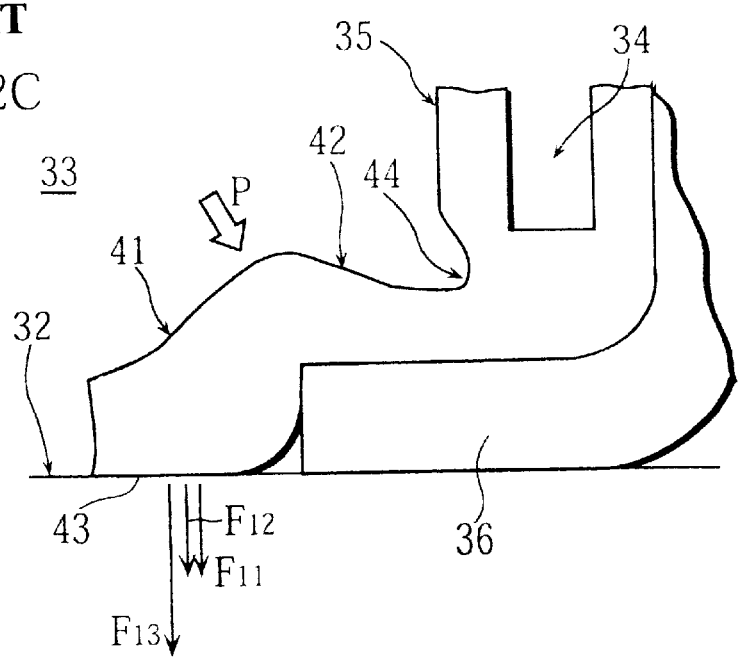
FIG. 42C is a working explanatory view of a principal portion of the conventional example.

Further, an R portion 18 is formed on the root of the lip portion 13 on the liquid storing chamber 33 side to lessen the elastic deformation of the root of the lip portion 13 by increasing pressure in the liquid storing chamber 33. That is to say, in comparison with the conventional example (FIG. 42), the lip portion has an R-shaped configuration instead of the concave portion (44), smaller pressure-receiving area on the fluid storing chamber 33 side, and amount of rubber of the root of the lip portion 13 is increased.

Therefore, in operation state in which the pressure in the fluid storing chamber 33 is increased, stress (of the pressure) is dispersed, and the elastic deformation of the root of the lip portion 13 is reduced. Fissures on the root of the lip portion 13 and exfoliation of the seal member 5 of rubber (the inner brim cover portion 5*b*) from the outer case 1 (the inner brim portion 2) are hardly generated, and contact pressure of (the contact portion 22 of) the lip end portion 13*b* is decreased further to reduce abrasion.

And, when the pressure P works on the lip end portion 13*b*, the lip end portion 13*b* is received (supported) by the slope receiving face A of the supporting metal 12 from the reverse side (an inner side) to prevent deformation, and sealability of the lip end portion 13*b* under high pressure can be kept good thereby.

As described above, in FIG. 14, the slope receiving face A of which inclination angle $\theta$ of $10° \leq \theta \leq 45°$ to the axis L is formed on the supporting metal 12 to approximately correspond to the inclination angle of the lip end portion 13*b* for holding (supporting) the lip end portion 13*b* certainly from the reverse (back) side, and deformation in pressure reception (refer to marks P) is prevented. The shaft seal demonstrates excellent sealability by keeping the inclination angle of the lip end portion 13*b* to be 10° to 45°.

Figure 15:
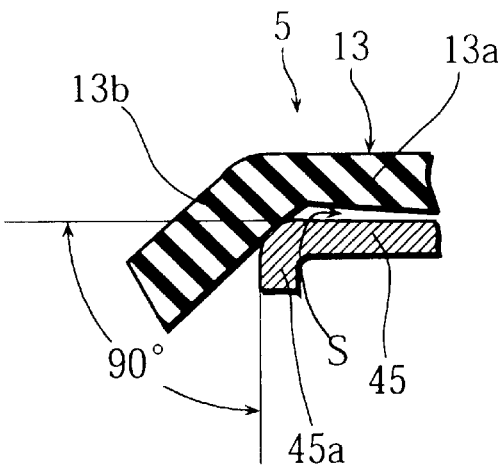
FIG. 15 is a half front view showing a modification of the third preferred embodiment.

As the modification of the third preferred embodiment shown in FIG. 15, the backup ring 45 disclosed by Japanese Utility Model Publication No. 2-47311 proposed in conventional oil seals may be applied to holding of the lip portion 13 of the seal member 5 of rubber That is to say, the end 45*a* of the backup ring 45 is bent for a right angle of 90°, and having an extremely short dimension.

Figure 18:
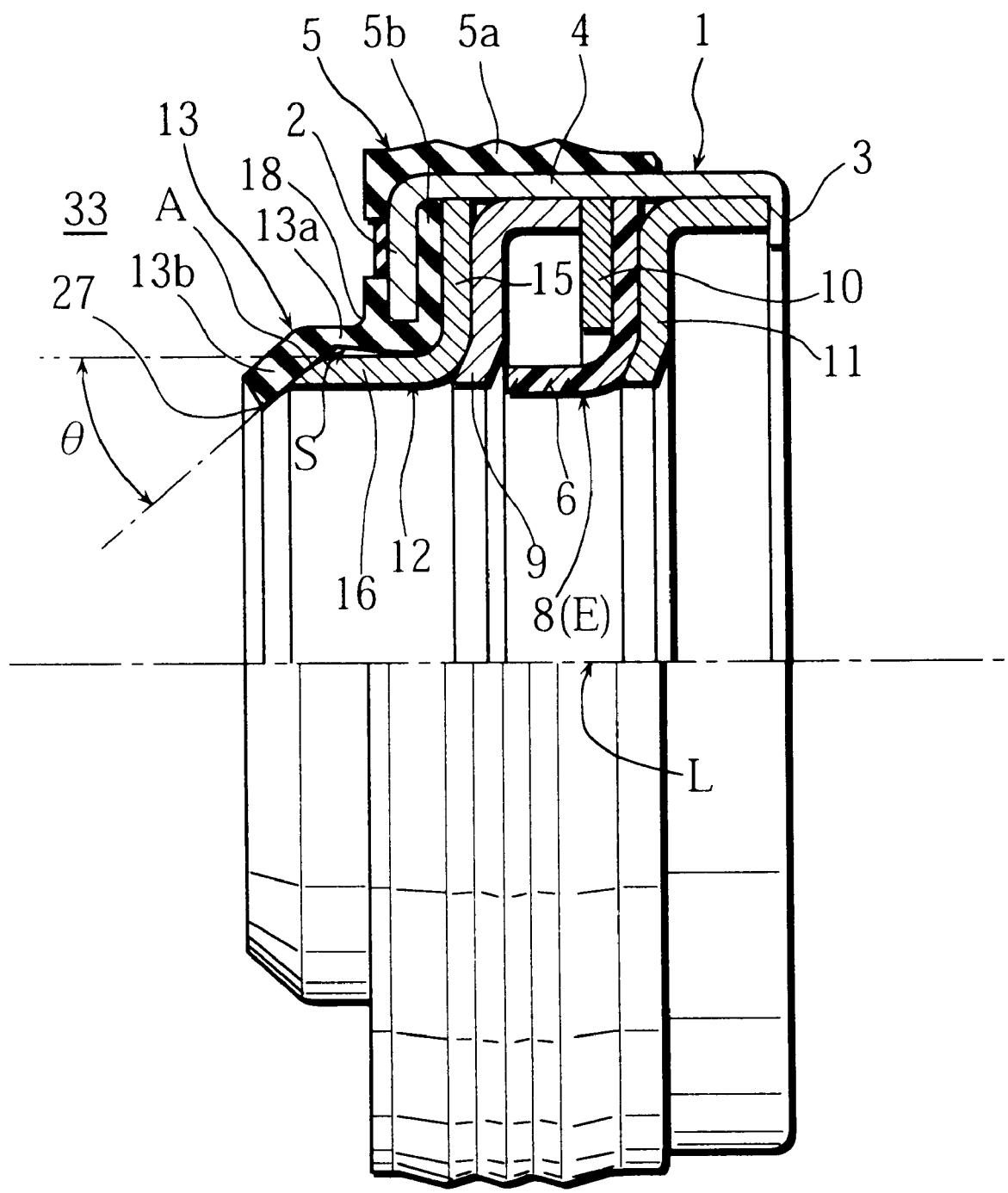
FIG. 18 is a half front view showing a modification of the third preferred embodiment.
Figure 19:
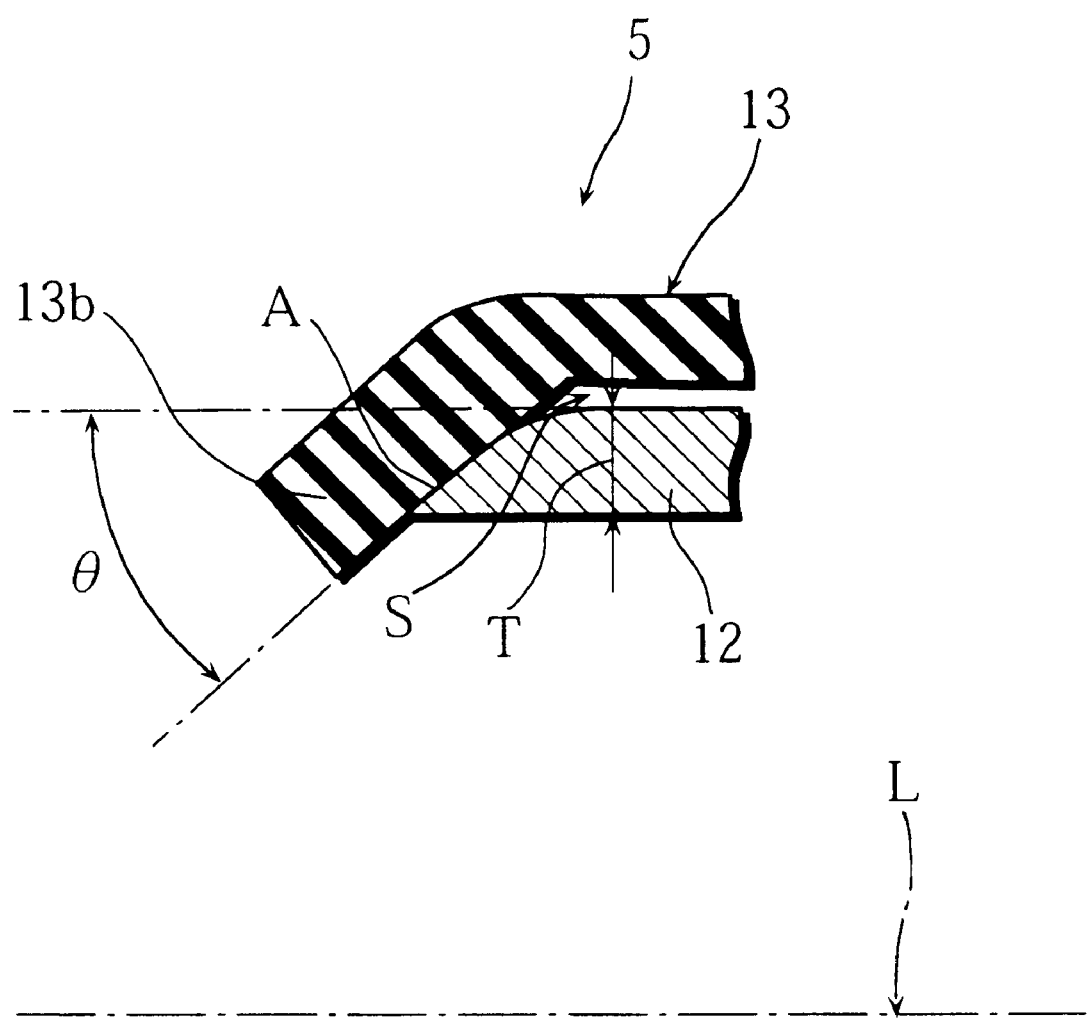
FIG. 19 is an enlarged cross-sectional view of a principal portion.

Next, FIG. 18 and FIG. 19 show another modification of the third preferred embodiment of the present invention. As clearly shown in comparison with FIG. 13 and FIG. 14, the modification is different in following construction.

That is to say, the first seal element 7 in FIG. 13 is omitted, the seal element E is composed exclusively of the second seal element 8, and the supporting metal 12 has a thickness dimension T enough to compensate the lack of the first seal element 7. And, the slope receiving face A is an end face of the supporting metal 12 (from which the bent portion 17 in FIG. 13 is omitted) made as to tightly fit to and support the reverse face (back face) side of the lip portion 13 of the seal member 5.

The inclination angle $\theta$ of the slope receiving face A with the axis L of the rotation shaft is set within the range of the above-described first preferred embodiment Explanation of other parts indicated with same marks as in the third preferred embodiment is omitted, since they are similarly constructed as in the third preferred embodiment.

Next, FIG. 20 shows other modifications of the third preferred embodiment of the present invention. As clearly shown in comparison with FIG. 13, the modification shown in FIG. 20A is different in following construction.

That is to say, the end face 2*a* of the inner brim portion 2 of the outer case 1 is positioned on a peripheral side (an outer side in diameter of the rotation shaft 32) to the peripheral face 23 of the short cylinder portion 13*a* of the lip portion 13, and the seal member 5 of rubber (the lip portion 13 and the inner brim cover portion 5*b*) is formed as to easily deforms in the axis L direction of the rotation shaft 32 (refer to FIG. 13) thereby. Therefore, the seal member 5 of rubber elastically deforms in the axis L direction of the rotation shaft 32 along the pressure increase of the fluid storing chamber 33, and the lip end portion 13*b* is drawn in the parting direction from the rotation shaft 32.

Figure 20A:
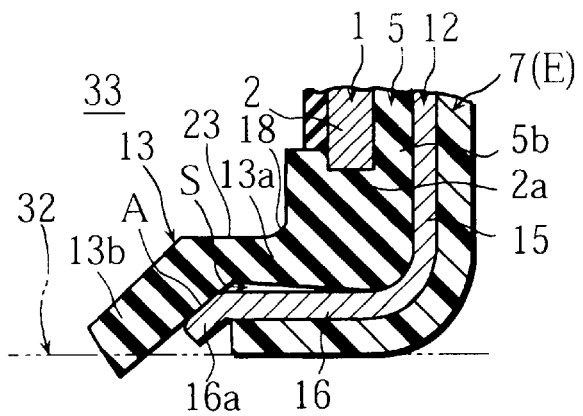
FIG. 20A is a cross-sectional view of a principal portion showing another modification of the third preferred embodiment.
Figure 20B:
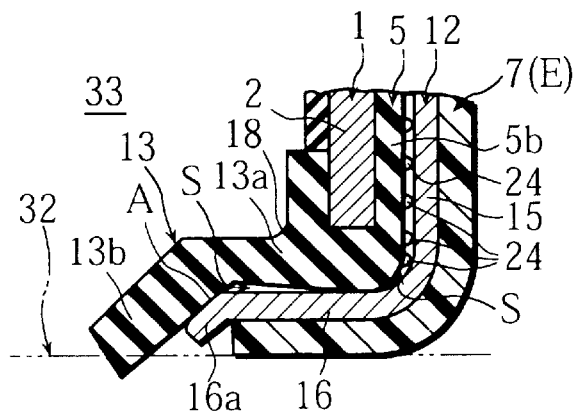
FIG. 20B is a cross-sectional view of a principal portion showing another modification of the third preferred embodiment.

And, the modification shown in FIG. 20B, as clearly shown in comparison with FIG. 13, is different in following construction. That is to say, in unpressurized state of the fluid storing chamber 33, the gap portion S is disposed between the inner brim cover portion 5*b* of the seal member 5 of rubber and the flat board portion 15 of the supporting metal 12, and the seal member 5 of rubber (the lip portion 13 and the inner brim cover portion 5*b*) is formed as to easily deforms in the axis L direction of the rotation shaft 32 (refer to FIG. 13) thereby. Therefore, the gap portion S is disposed between the seal member 5 of rubber and the supporting metal 12 for holding the back face of the seal member 5 of rubber, and the seal member 5 of rubber elastically deforms accompanied with the pressure increase of the fluid storing chamber 33 to get into the gap portion S, and the lip end portion 13*b* is drawn in the parting direction from the rotation shaft 32. And, plural protruding portions 24 may be disposed between the inner brim cover portion 5*b* and the flat board portion 15 to form the gap portion between the inner brim cover portion 5*b* and the flat board portion 15.

Figure 20C:
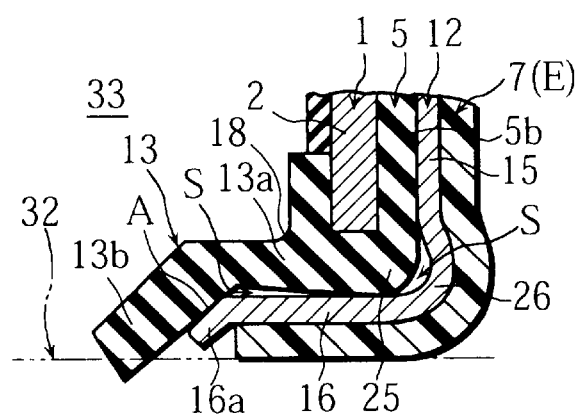
FIG. 20C is a cross-sectional view of a principal portion showing another modification of the third preferred embodiment.

Further, the modification shown in FIG. 20C, as clearly shown in comparison with FIG. 13, is different in following construction. That is to say, in unpressurized state of the fluid storing chamber 33, a connecting portion 26 of the flat board portion 15 (of the supporting metal 12) and the cylinder portion 16 facing a connecting portion 25 of the inner brim cover portion 5*b* (of the seal member 5) and the lip portion 13 (the short cylinder portion 13*a*) is bent opposite to the fluid storing chamber 33 side to make the gap portion S between the connecting portion 25 (of the seal member 5) and the connecting portion 26 (of the supporting metal 12), and the seal member 5 of rubber (the lip portion 13) is formed as to easily deforms in the axis L direction of the rotation shaft 32 (refer to FIG. 13) thereby. Therefore, the gap portion S is disposed between the seal member 5 of rubber and the supporting metal 12 for holding the back face of the seal member 5 of rubber, and the seal member 5 of rubber elastically deforms accompanied with the pressure increase of the fluid storing chamber 33 to get into the gap portion S to give force to the lip end portion 13b in the parting direction from the rotation shaft 32.

Figure 20D:
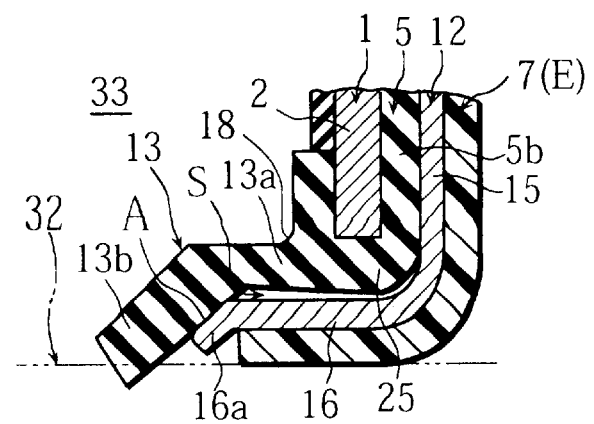
FIG. 20D is a cross-sectional view of a principal portion showing another modification of the third preferred embodiment.

And, the modification shown in FIG. 20D, as clearly shown in comparison with FIG. 13, is different in following construction. That is to say, in unpressurized state of the fluid storing chamber 33, the short cylinder portion 13a (the connecting portion 25 of the inner brim cover portion 5b and the lip portion 13) is parted from the cylinder portion 16 as the short cylinder portion 13a of the seal member 5 of rubber and the cylinder portion 16 of the supporting metal 12 do not contact each other, and the seal member 5 of rubber (the lip portion 13) is formed as to easily deforms in the axis L direction of the rotation shaft 32 (refer to FIG. 13) thereby. Therefore, the gap portion S is disposed between the seal member 5 of rubber and the supporting metal 12 for holding the back face of the seal member 5 of rubber, and the seal member 5 of rubber elastically deforms accompanied with the pressure increase of the fluid storing chamber 33 to get into the gap portion S as force, which draws the lip end portion 13b in the parting direction from the rotation shaft 32, works.

And, in an unpressurized state of the fluid storing chamber 33 (as shown in FIG. 20A through FIG. 20C), if the short cylinder portion 13a of the seal member 5 contacts the cylinder portion 16 of the supporting metal 12, the cylinder portion 16 or a contact portion (the connecting portion 25 of the inner brim cover portion 5b and the lip portion 13) may be treated with low friction resin coating to reduce the frictional force, and the seal member 5 of rubber (the lip portion 13 and the inner brim cover portion 5b) is formed as to easily deforms in the axis L direction of the rotation shaft 32 (refer to FIG. 13) thereby.

And, these (individual) constructions shown in FIG. 20A through FIG. 20D may be combined in various methods, and the seal member 5 of rubber (the lip portion 13 and the inner brim cover portion 5b) may be formed as to easily deform, accompanied with the pressure increase of the fluid storing chamber 33, in the axis L direction of the rotation shaft 32 (refer to FIG. 13) thereby.

Next, FIG. 21 and FIG. 22 show still another modification of the third preferred embodiment of the present invention. As clearly shown in comparison with FIG. 16 and FIG. 17, the modification is different in following construction.

That is to say, the gap portion S in FIG. 16A between the lip portion 13 and the supporting metal 12 (the cylinder portion 16) does not exist, and another gap portion S is formed between the supporting metal 12 and the connecting portion 25 of the inner brim cover portion 5b (of the seal member 5) and the lip portion 13 (the short cylinder portion 13a).

To describe concretely, as shown in FIG. 21A, in the seal member 5 of rubber in non-attached state (free state) to the rotation shaft 32, the gap portion S is disposed between, the connecting portion 25 of the inner brim cover portion 5b and the lip portion 13, and, the connecting portion 26 of the flat board portion 15 and the cylinder portion 16 (of the supporting metal 12), and the short cylinder portion 13a and the lip end portion 13b of the lip portion 13 are supported by the cylinder portion 16 and the slope receiving face A of the supporting metal 12 fit to the lip portion 13.

And, as shown in FIG. 21B, the lip portion 13 elastically deforms as to get into the gap portion S (as the connecting portion 25 contacts the connecting portion 26) when pressure P (of high-pressure fluid, etc.) works on the seal member 5 of rubber (the lip portion 13). That is to say, locomotion force $F_x$ for elastic deformation in the axis L direction of the rotation shaft 32 (refer to FIG. 13) and pressing force $F_y$ for elastic deformation in vertical direction to the axis L work on the lip portion 13.

In this case, the lip end portion 13b of the lip portion 13 is drawn in the parting direction from the rotation shaft 32 along the slope receiving face A by the locomotion force $F_x$. That is to say, tensile force $F_1$ works on an end corner portion 27 of the lip end portion 13b in the parting direction from the rotation shaft 32.

Figure 22A:
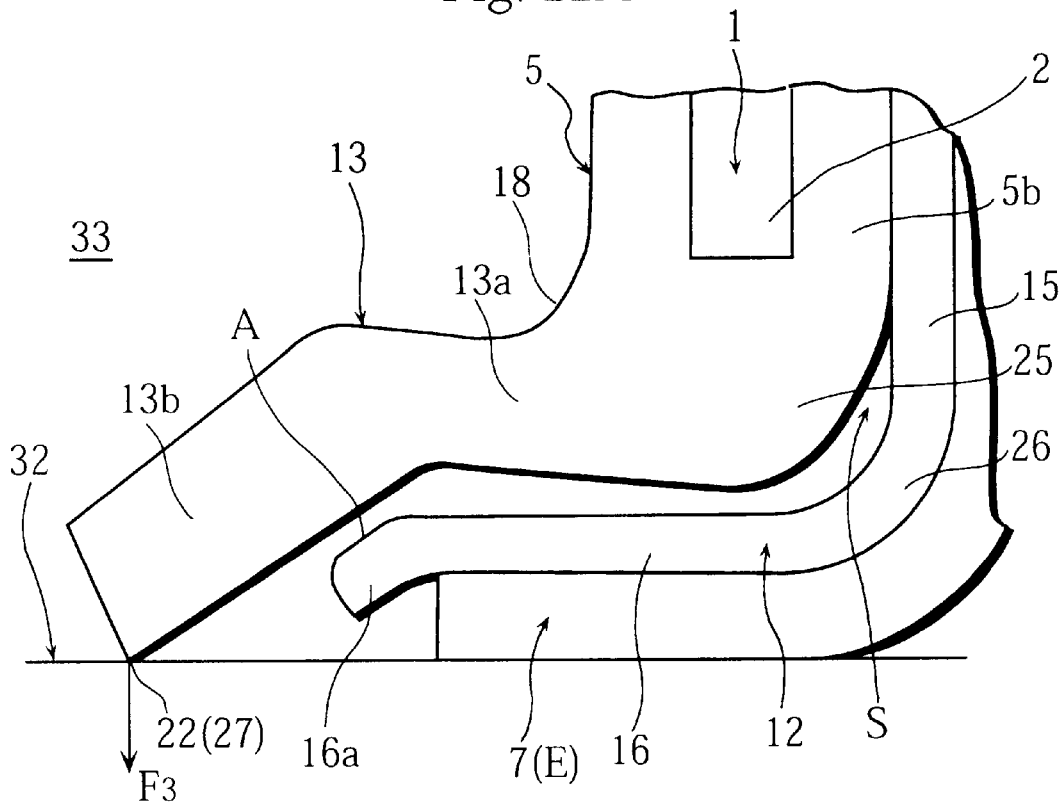
FIG. 22A is a working explanatory view of a principal portion.

And, when the seal member 5 of rubber is attached to the rotation shaft 32 and the fluid storing chamber 23 is not pressurized, as shown in FIG. 22A, the lip portion 13 parts from the slope receiving face A, the gap portion S is enlarged, and the elastically-pushed seal member 5 of rubber (the lip portion 13) linearly contact (the peripheral face of) the rotation shaft 32. That is to say, tightening force $F_3$ generated by elasticity of rubber works on a contact portion 22 (an end corner portion 27) of the lip end portion 13b (with the rotation shaft 32) toward the rotation shaft 32.

Figure 22B:
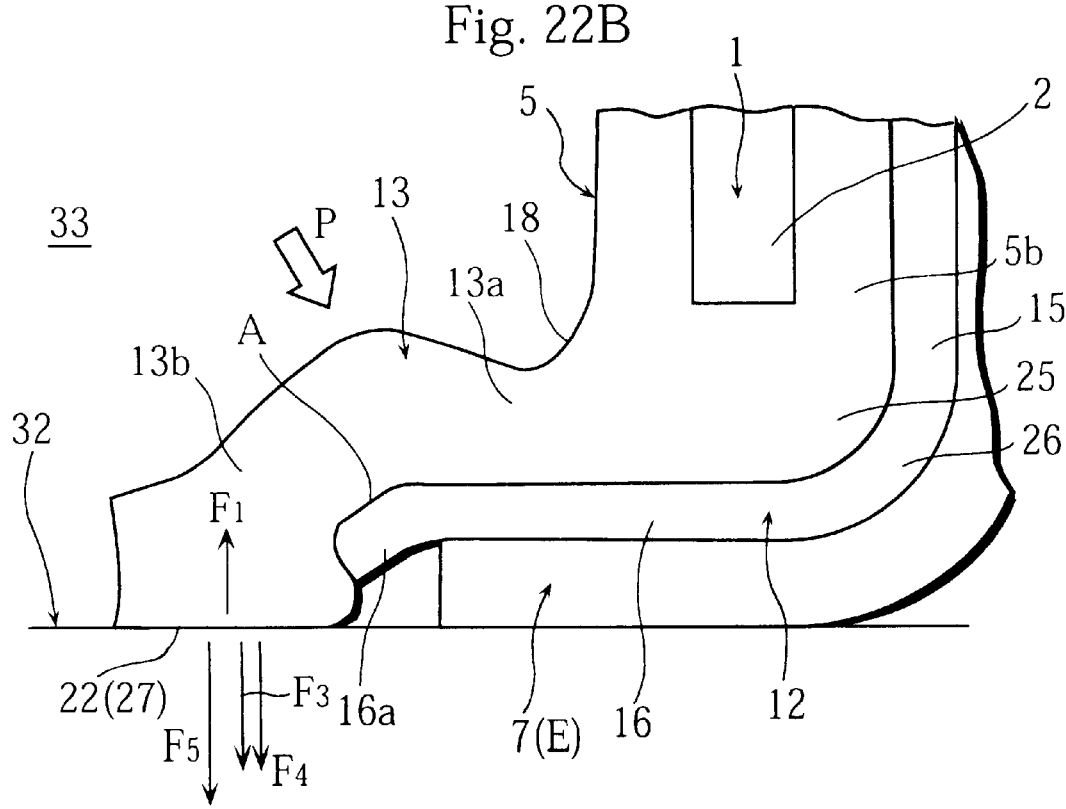
FIG. 22B is a working explanatory view of a principal portion.

And, as shown in FIG. 22B, in pressurized (operation) state of the fluid storing chamber 33, self-sealing force $F_4$ (generated by the pressurization), (the above-mentioned) tightening force $F_3$, and (the above-mentioned) tensile force $F_1$ work on the contact portion 22 (the end corner portion 27) of the lip end portion 13b toward the rotation shaft 32. That is to say, total force $F_5$ ($=F_3+F_4-F_1$) works on the contact portion 22 (the end corner portion 27) of the lip end portion 13b toward the rotation shaft 32.

Therefore, in comparison with the case (in which the gap portion S does not exist in the non-attached state to the rotation shaft 32) shown in the conventional example (FIG. 41), force working on the rotation shaft 32 diminishes (for the tensile force $F_1$), abrasion (of the contact portion 22) of the lip end portion 13b is reduced. And, in comparison with the case shown in FIG. 16 and FIG. 17, the seal is highly stable in the non-attached state to the rotation shaft 32 because the short cylinder portion 13a of the seal member 5 of rubber is fit to and supported by the cylinder portion 16 of the supporting metal 12.

Next, FIG. 23 shows further modifications of the third preferred embodiment of the present invention. That is to say, the short cylinder portion 13a and the lip end portion 13b of the lip portion 13 are fit to and supported by the slope receiving face A and the cylinder portion 16 of the supporting metal 12, and the individual constructions shown in FIG. 20B through FIG. 20D are combined.

Figure 23A:
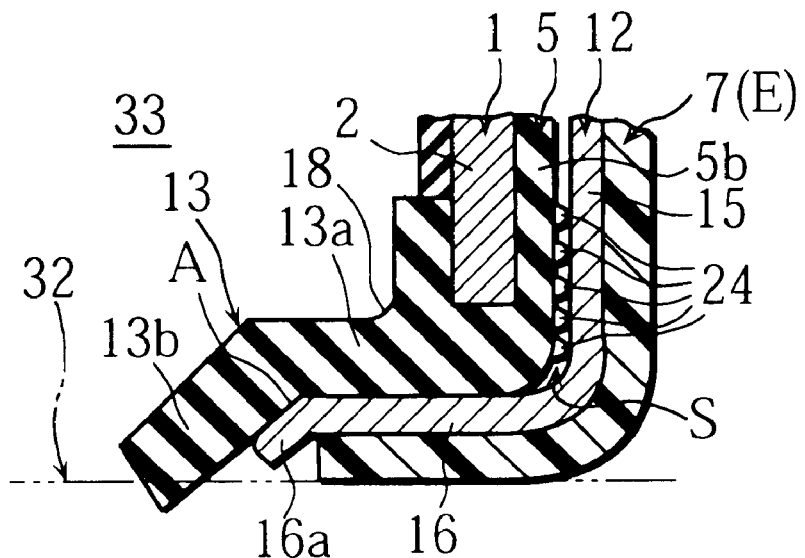
FIG. 23A is a cross-sectional view of a principal portion showing a further modification of the third preferred embodiment.

To describe concretely, as shown in FIG. 23A, in the unpressurized state of the fluid storing chamber 33, the gap portion S is disposed between the inner brim cover portion 5b of the seal member 5 of rubber and the flat board portion 15 of the supporting metal 12, and the seal member 5 of rubber (the lip portion 13 and the inner brim cover portion 5b) is formed as to easily deforms in the axis L direction of the rotation shaft 32 (refer to FIG. 13) thereby. Therefore, the seal member 5 of rubber elastically deforms accompanied with the pressure increase of the fluid storing chamber 33 in the parting direction from the rotation shaft 32, and the lip end portion 13b is drawn in the parting direction from the rotation shaft 32. And, plural protruding portions 24 may be disposed between the inner brim cover portion 5b and the flat board portion 15 to form the gap portion S between the inner brim cover portion 5b and the flat board portion 15.

Figure 23B:
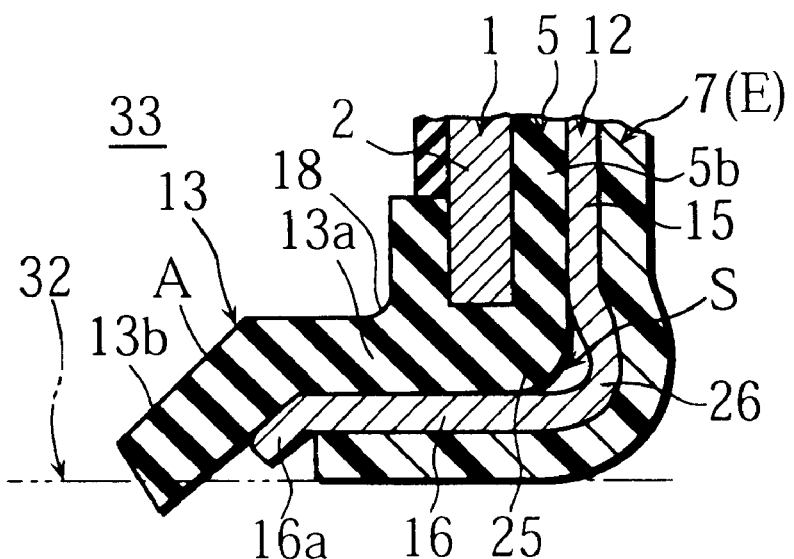
FIG. 23B is a cross-sectional view of a principal portion showing a further modification of the third preferred embodiment.

And, as shown in FIG. 23B, in the unpressurized state of the fluid storing chamber 33, a connecting portion 26 of the flat board portion 15 (of the supporting metal 12) and the cylinder portion 16 facing a connecting portion 25 of the inner brim cover portion 5b (of the seal member 5) and the lip portion 13 (the short cylinder portion 13a) is bent opposite to the fluid storing chamber 33 side to make the gap portion S between the connecting portion 25 (of the seal member 5) and the connecting portion 26 (of the supporting metal 12), and the seal member 5 of rubber (the lip portion 13) is formed as to easily deforms in the axis L direction of the rotation shaft 32 (refer to FIG. 13) the reby.

And, in an unpressurized state of the fluid storing chamber 33 (as shown in FIG. 23A and FIG. 23B), a contact face of the short cylinder portion 13 of the seal member 5 and the cylinder portion 16 of the supporting metal 12 may be treated with low friction resin coating to reduce the frictional force, and the seal member 5 of rubber (the lip portion 13 and the inner brim cover portion 5b) is formed as to easily deforms in the axis L direction of the rotation shaft 32 (refer to FIG. 13) thereby.

And naturally, these (individual) constructions shown in FIG. 23A and FIG. 23B may be combined in various methods, and the seal member 5 of rubber (the lip portion 13 and the inner brim cover portion 5b) may be formed as to easily deform, accompanied with the pressure increase of the fluid storing chamber 33, in the axis L direction of the rotation shaft 32 (refer to FIG. 13) thereby.

And, although not shown in FIGS., the seal member may be formed as to have the end corner portion 27 which linearly contacts or slightly part from the rotation shaft 32 without interference in the unpressurized state, and contacts the rotation shaft 32 in the pressurized state. And, the tightening force $F_3$ (refer to FIG. 17) does not work on the contact portion 22 of the lip end portion 13b (the end corner portion 27) when the seal is attached to the rotation shaft 32. Therefore, abrasion is reduced further in comparison with the conventional example (in FIG. 41) because contact pressure of the lip end portion 13b onto the surface of the rotation shaft 32 is decreased by synergistic effect of that interference does not exist, and the seal has the gap portion S.

Next, FIG. 24 through FIG. 30 show a fourth preferred embodiment of the present invention. As clearly shown in comparison with the first through third preferred embodiments described above, the fourth preferred embodiment is different in following construction. Explanation of parts indicated with same marks as in the former preferred embodiments is omitted, since they are similarly constructed as in the former preferred embodiments.

Figure 24:
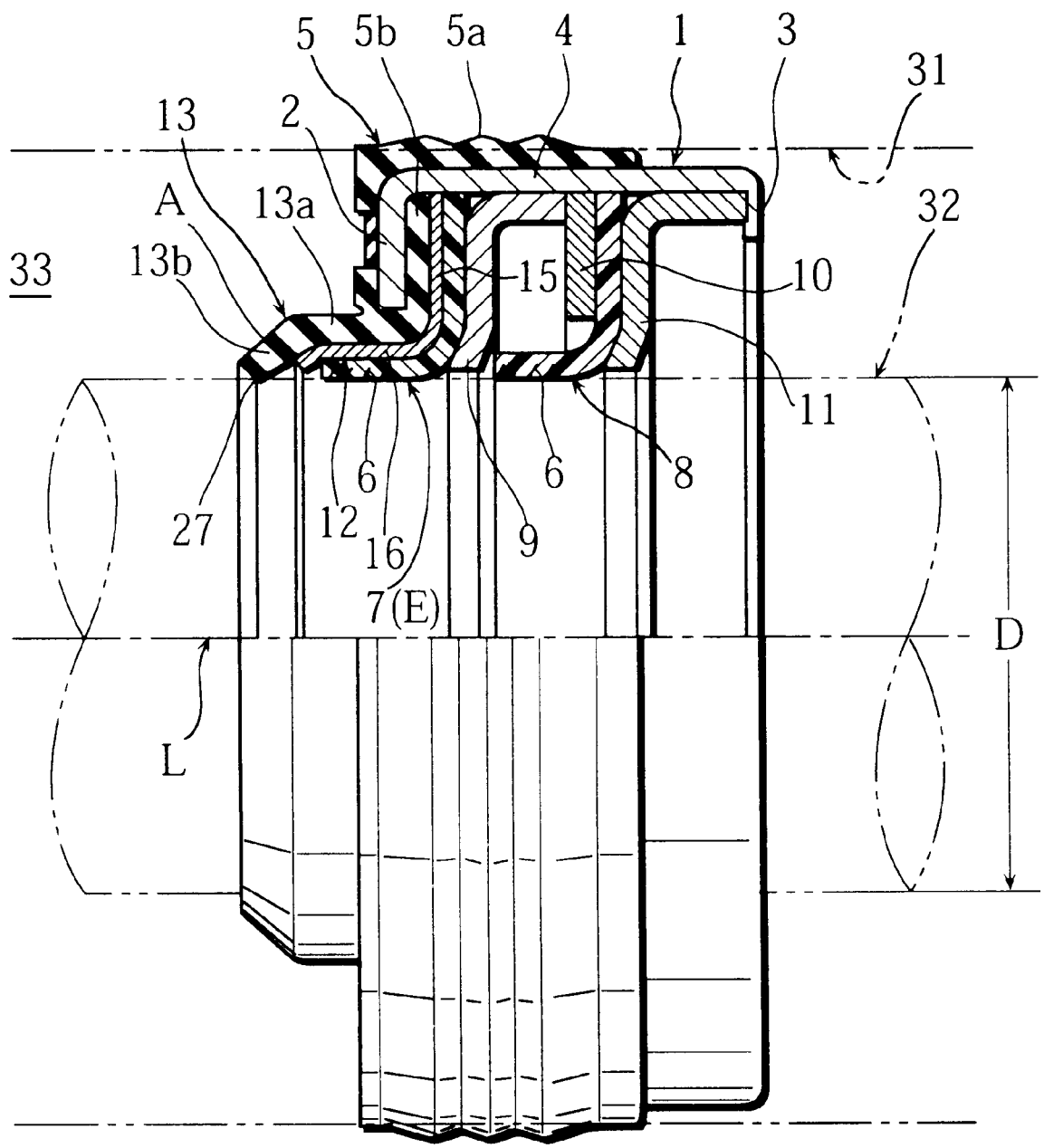
FIG. 24 is a half front view showing a fourth preferred embodiment of the present invention.

That is to say, as shown in FIG. 24, configuration and dimensions of the end corner portion 27 of the lip end portion 13b are set as the end corner portion 27 linearly contacts without interference or slightly parts from (the peripheral face of) the rotation shaft 32 in unpressurized state. The interference is equivalent to the mark G of the conventional example in FIG. 42, "without interference" means G≈0, and "slightly part from" means G<0.

And, the supporting metal 12 is disposed between the first seal element 7 and the seal member 5 as to fit to and support an opposite side to the fluid storing chamber or inner portion of the inner brim cover portion 5b of the seal member 5, the short cylinder portion 13a, and the lip end portion 13b.

Figure 25A:
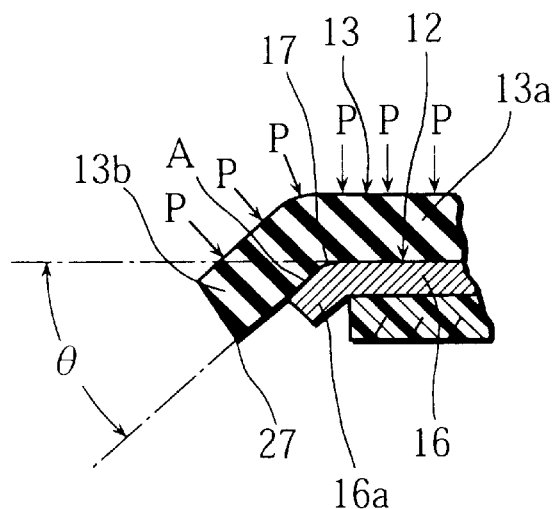
FIG. 25A is an enlarged cross-sectional view of a principal portion.

As shown in FIG. 24 and FIG. 25, the lip end portion 13b has an inclination angle of 10° to 45° to an axis L of the rotation shaft 32, and the supporting metal 12, as to correspond to the lip end portion 13b, has a slope receiving face A on its end as to have an inclination angle θ of 10° to 45° to the axis L.

Concretely, the supporting metal 12, of which cross section is approximately L-shaped, is composed of a flat board portion 15 at right angles with the axis L, and a cylinder portion 16 of short cylinder of which center is the axis L. An end portion 16a (on the fluid storing chamber 33 side) of the cylinder portion 16 is bent with the above inclination angle θ at a bent portion 17 as to diminish in diameter gradually to the end, and a peripheral face of the end portion 16a forms the former-mentioned slope receiving face A.

Figure 25B:
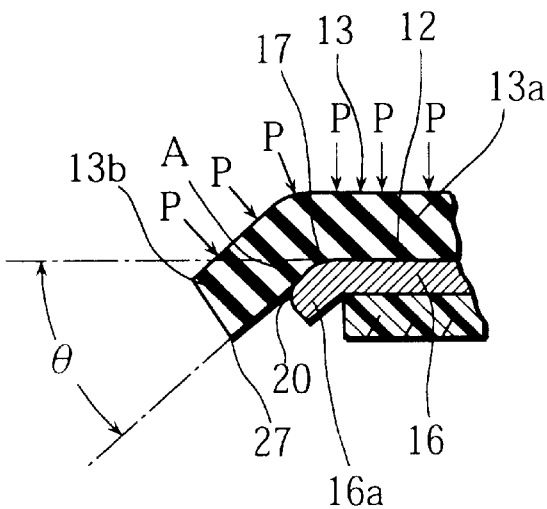
FIG. 25B is an enlarged cross-sectional view of a principal portion.

The bent portion 17 corresponds and tightly fits to the short cylinder portion 13a of the seal member 5 and a bent inner corner of the lip end Portion 13b. And, as shown in FIG. 25B, it is preferable to form an R-shaped chamfer 20 on an end corner portion of the slope receiving face A of the supporting metal 12. That is to say, an end corner portion of the supporting metal 12 is effectively prevented from biting into the lip end portion 13b of the lip portion 13 to cause fissures in the lip end portion 13b.

And, as shown in FIG. 24, the outer case 1 is unified with the seal member 5 of rubber by adhesion, etc. beforehand. The supporting metal 12, the first seal element 7, the first inner case 9, the washer 10, the second seal element 8, and the second inner case 11 are serially fitted to the outer case 1 in a straight state (a cylindrical state) in which the inner brim portion 3 is not formed. Then, the inner brim portion 3 is formed by caulking and the all parts are unified.

The supporting metal 12, the first inner case 9, the second inner case 11, the washer 10, and the outer case 1 are made of metal such as steel. The first seal element 7 and the second seal element 8 are made of fluororesin such as PTFE. Further, the seal member 5 is, considering cooling medium resistance, made of HNBR of which JIS hardness is preferably set to be 87 to 96 (by composition of HNBR) to prevent deformation when the seal receives pressure. The seal member is greatly deformed when the JIS hardness is lower than 87, and slightly poor in elasticity when the JIS hardness is higher than 96.

Figure 27A:
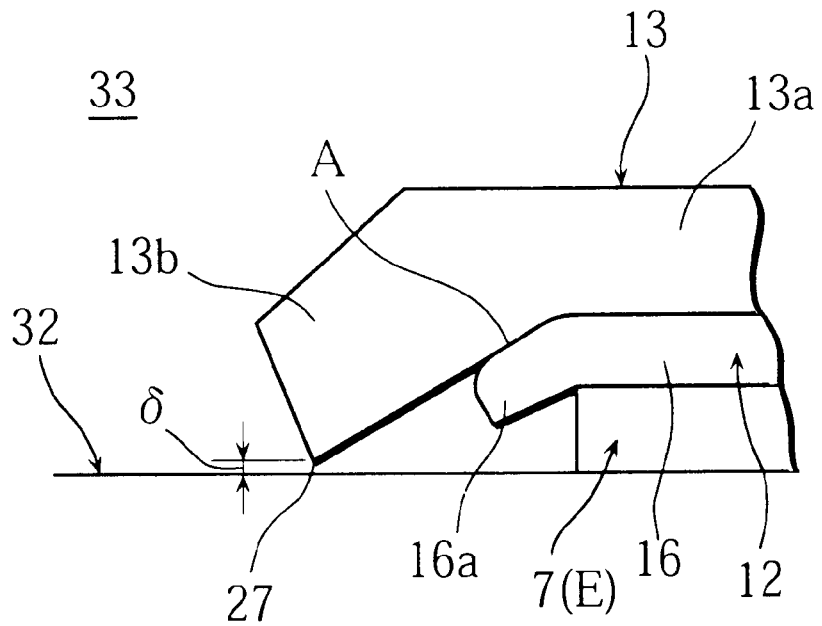
FIG. 27A is a working explanatory view of a principal portion.
Figure 27B:
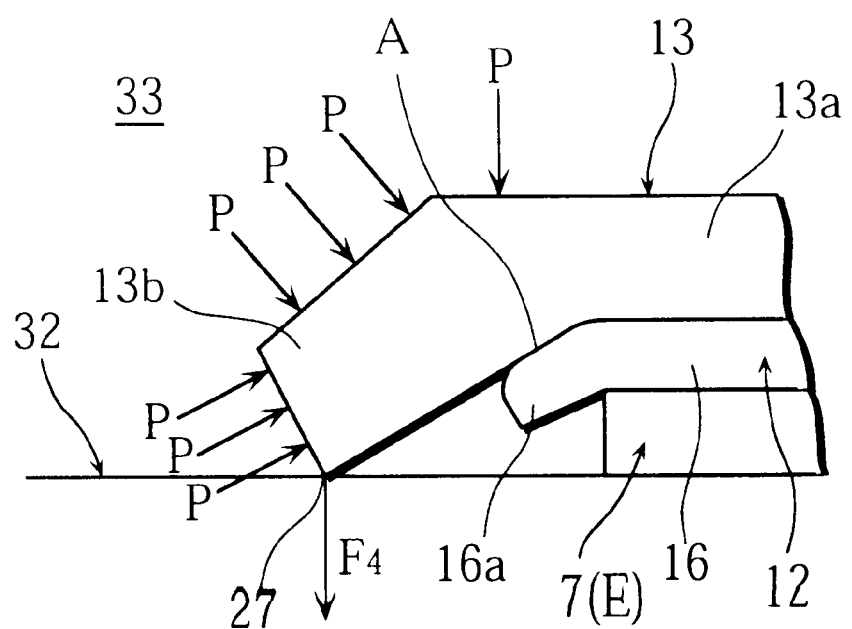
FIG. 27B is a working explanatory view of a principal portion.

And, to describe sealing function, as shown in FIG. 27A, in attached state before the fluid storing chamber is pressurized, the end corner portion 27 which linearly contacts or slightly part from the peripheral face of the rotation shaft 32 without interference. And as shown in FIG. 27B, self-sealing force $F_4$ works on the end corner portion 27 to the peripheral face of the rotation shaft 32 by pressure P working on the lip portion 13 in the pressurized state of the fluid storing chamber 33, and the end corner portion 27 linearly contacts the rotation shaft 32 thereby. And, the tightening force ($F_{11}$) is not generated (or micro, if generated) onto the peripheral face of the rotation shaft 32 because the interference portion (46) of the conventional example (in FIG. 42) does not exist, and the force working on the position of (the end corner portion 27 of) the lip end portion 13b on the rotation shaft 32 is smaller than that of the conventional example (in FIG. 42) for the tightening force ($F_{11}$).

Therefore, the force working on the rotation shaft 32 becomes small, and consequently, abrasion of the lip end portion 13b is reduced (by decreasing the contact pressure). And, especially in case that high-pressure cooling media (such as $CO_2$) are used, it is effective for sealing when the rotation shaft 32 is stationary because the seal is continuously pressurized and negative pressure is not generated.

And, the lip end portion 13b is received (supported) by the slope receiving face A of the supporting metal 12 from a reverse side (inner side) and prevented from being deformed when pressure P works on the lip end portion 13b on the fluid storing chamber 33 side (as shown in FIG. 2), and good sealability of the lip end portion 13b is kept good under high pressure.

As described above, the slope receiving face A of which inclination angle θ of 10°≦θ≦45° to the axis L is formed on the supporting metal 12 to approximately correspond to the inclination angle of the lip end portion 13b for holding (supporting) the lip end portion 13b certainly from the reverse (back) side, and deformation in pressure reception (refer to marks P) is prevented. The shaft seal demonstrates excellent sealability by keeping the inclination angle of the lip end portion 13b to be 10° to 45°.

Figure 26:
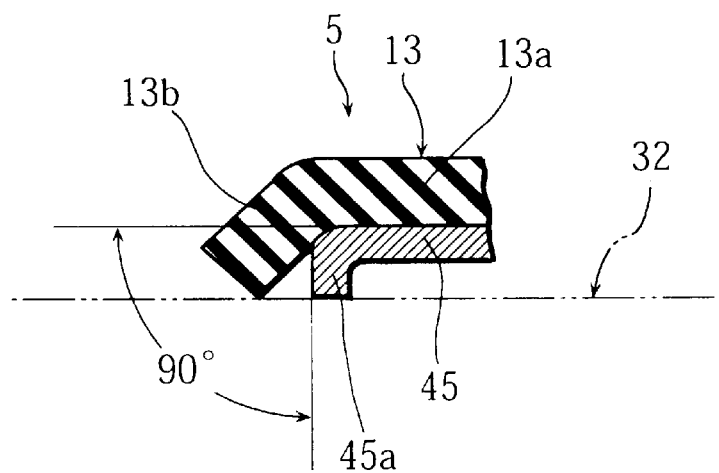
FIG. 26 is an enlarged cross-sectional view of a principal portion showing a modification of the fourth preferred embodiment.

FIG. 26 shows a modification of the fourth preferred embodiment, in which the backup ring 45, proposed in conventional oil seals and disclosed by Japanese Utility Model Publication No. 2-47311, is applied to holding of the lip portion 13 of the seal member 5 of rubber. That is to say, the end 45a of the backup ring 45 is bent for 90°. And the interference of the end corner portion 27 is set to be 0 (or minus, namely, slightly parted).

And, as shown in FIG. 24 and FIG. 27A, a distanced δ, between the end corner portion 27 of the lip end portion 13b and the rotation shaft 32 in unpressurized state, is preferably arranged less than 7% of an outer diameter dimension D of the rotation shaft 32 to prevent the abrasion of the end corner portion 27 of the lip end portion 13b, and demonstrate excellent sealability. If the distances is over 7% of the dimension D, the lip end portion 13b does not sufficiently contact the rotation shaft 32 when the lip portion 13 receives the pressure P (refer to FIG. 27B), the fluid leaks, and certain sealing can not be expected.

Figure 28:
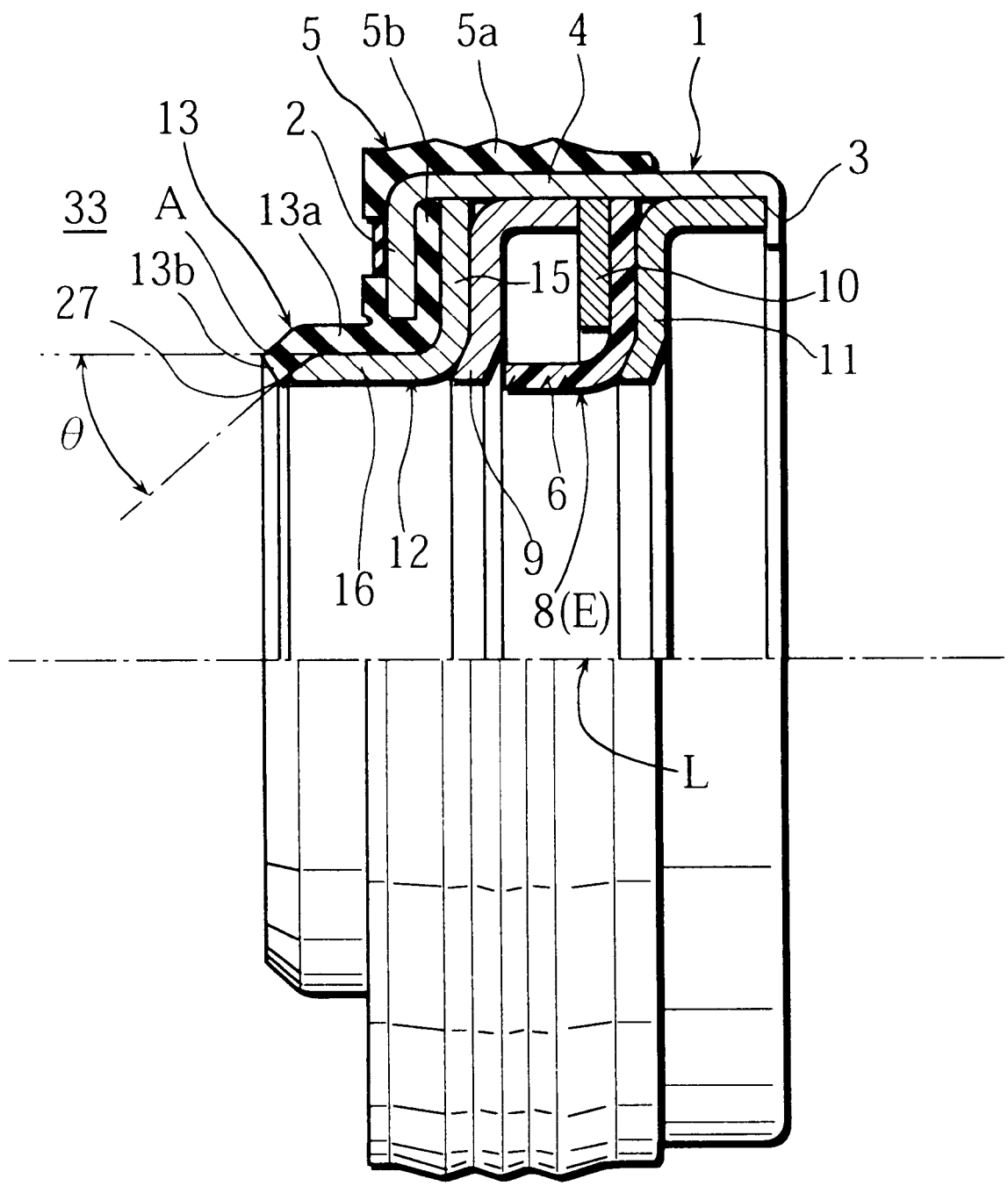
FIG. 28 is a half front view showing another modification of the fourth preferred embodiment.
Figure 29:
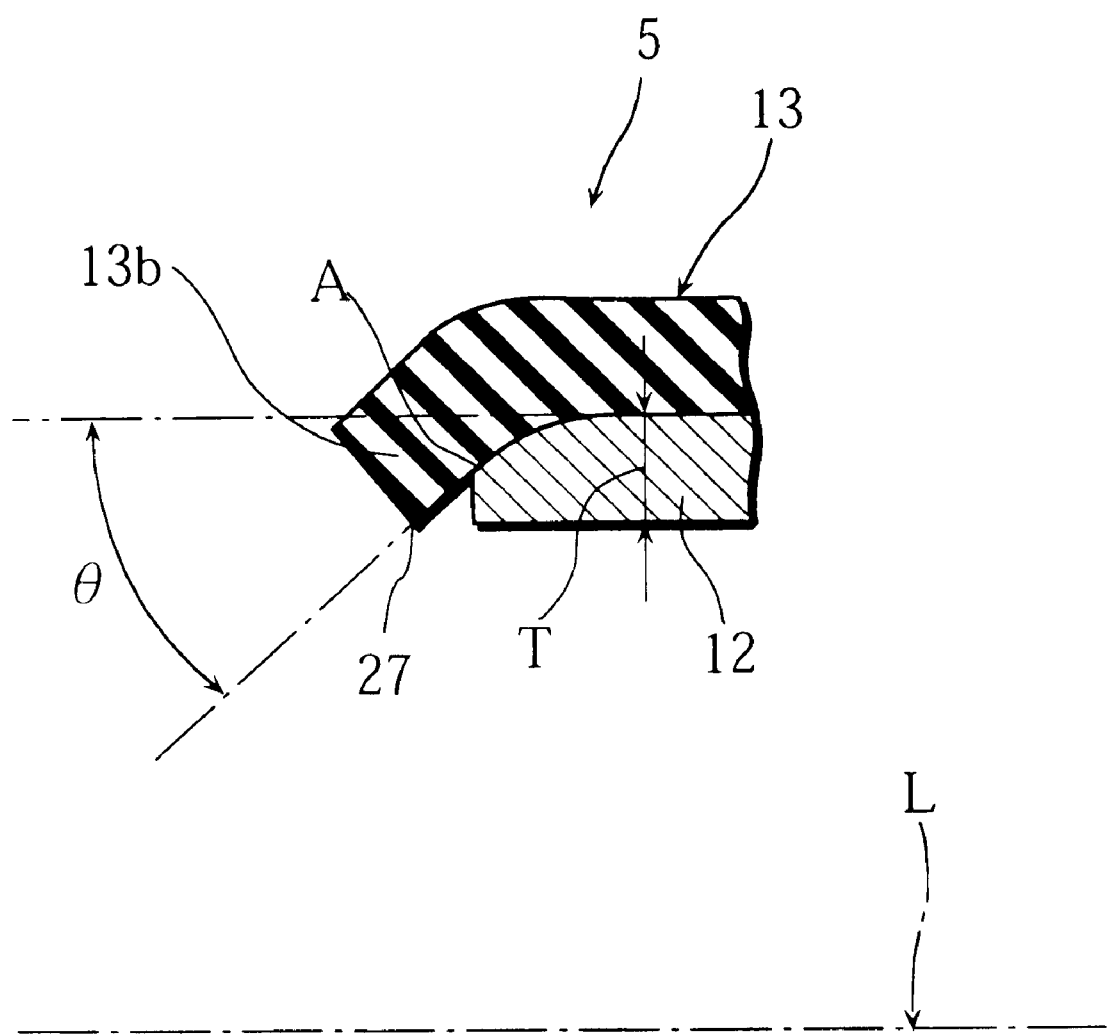
FIG. 29 is an enlarged cross-sectional view of a principal portion.

Next, FIG. 28 and FIG. 29 show another modification of the fourth preferred embodiment of the present invention. As clearly shown in comparison with FIG. 24 and FIG. 25, the modification is different in following construction.

That is to say, the first seal element 7 in FIG. 24 is omitted, the seal element E is composed exclusively of the second seal element 8, and the supporting metal 12 has a thickness dimension T enough to compensate the lack of the first seal element 7. And, the slope receiving face A is an end face of the supporting metal 12 (from which the bent portion 17 in FIG. 24 is omitted) made as to tightly fit to and support the reverse face (back face) side of the lip portion 13 of the seal member 5.

The inclination angle θ of the slope receiving face A with the axis L of the rotation shaft is set within the range of the above-described fourth preferred embodiment. Explanation of other parts indicated with same marks as in the fourth preferred embodiment is omitted, since they are similarly constructed as in the fourth preferred embodiment.

And, FIG. 30 shows a still another modification of the fourth preferred embodiment of the present invention. As clearly shown in comparison with FIG. 27 and FIG. 29, the modification is different in following construction.

Figure 30A:
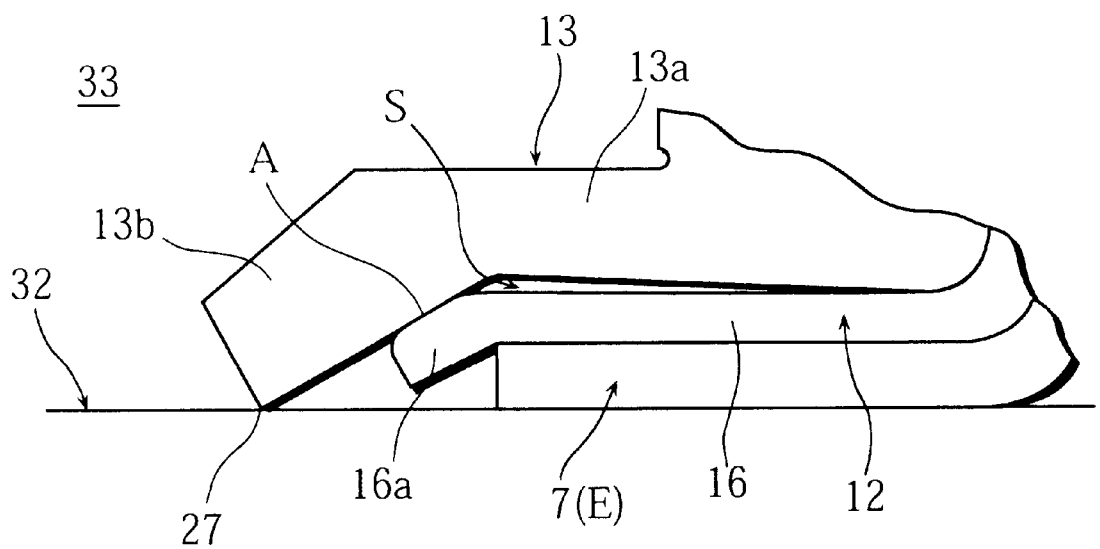
FIG. 30A is a working-explanatory view of a principal portion showing a still another modification of the fourth preferred embodiment.

That is to say, as shown in FIG. 30A, in unpressurized state the seal is attached to the rotation shaft 32, the supporting metal 12 has a slope receiving face A which fits to and support the reverse face (back face) side of (the lip end portion 13b of ) the lip portion 13, and a gap portion P between the reverse face (back face) side of (the short cylinder portion 13a of ) the lip portion 13 and the cylinder portion 16 of the supporting metal 12.

Figure 30B:
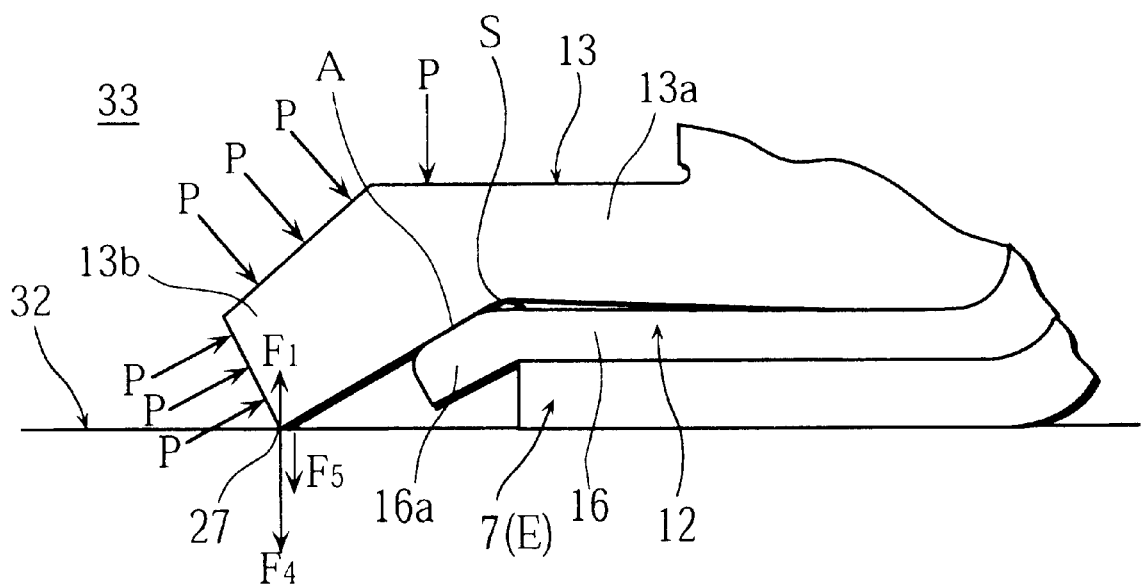
FIG. 30B is a working-explanatory view of a principal portion showing a still another modification of the fourth preferred embodiment.

And, as shown in FIG. 30B, in pressurized operation, (the short cylinder portion 13a of ) the lip portion 13 is elastically deformed as to get into the gap portion S by the pressure P working on the fluid storing chamber 33 side.

In this case, the lip end portion 13b of the lip portion 13 is drawn along the slope receiving face A in a parting direction from the rotation shaft 32. That is to say, tensile force $F_1$ works on the end corner portion 27 of the lip end portion 13b in the parting direction from the rotation shaft 32.

As described above, the tensile force $F_1$ works on the end corner portion 27 of the lip end portion 13b in the parting direction from the rotation shaft 32. And, (as formerly described) the self-sealing force $F_4$ works on the end corner portion 27. Consequently, total force $F_5$ ($=F_4-F_1$) works on the peripheral face of the rotation shaft 32.

Therefore, in comparison with the case (the gap portion S does not exist) shown in FIG. 27, the force working on the rotation shaft 32 becomes small (for the tensile force $F_1$), and the abrasion of the lip end portion 13b is reduced further. Further, the abrasion is reduced further in comparison with the conventional example (in FIG. 42) because the force working onto the surface of the rotation shaft 32 is decreased by synergistic effect of that the interference portion (46) (the interference G) in the conventional example (in FIG. 42) does not exist, and the seal has the gap portion S (for the tightening force $F_{11}$ and the tensile force $F_1$).

Next, FIG. 31 through FIG. 40 show a fifth preferred embodiment of the present invention. As clearly shown in comparison with the first through the fourth preferred embodiments, the fifth preferred embodiment is different in following construction. Explanation of the parts indicated with same marks as in the former preferred embodiments is omitted, since they are similarly constructed as in the former preferred embodiments.

Figure 31:
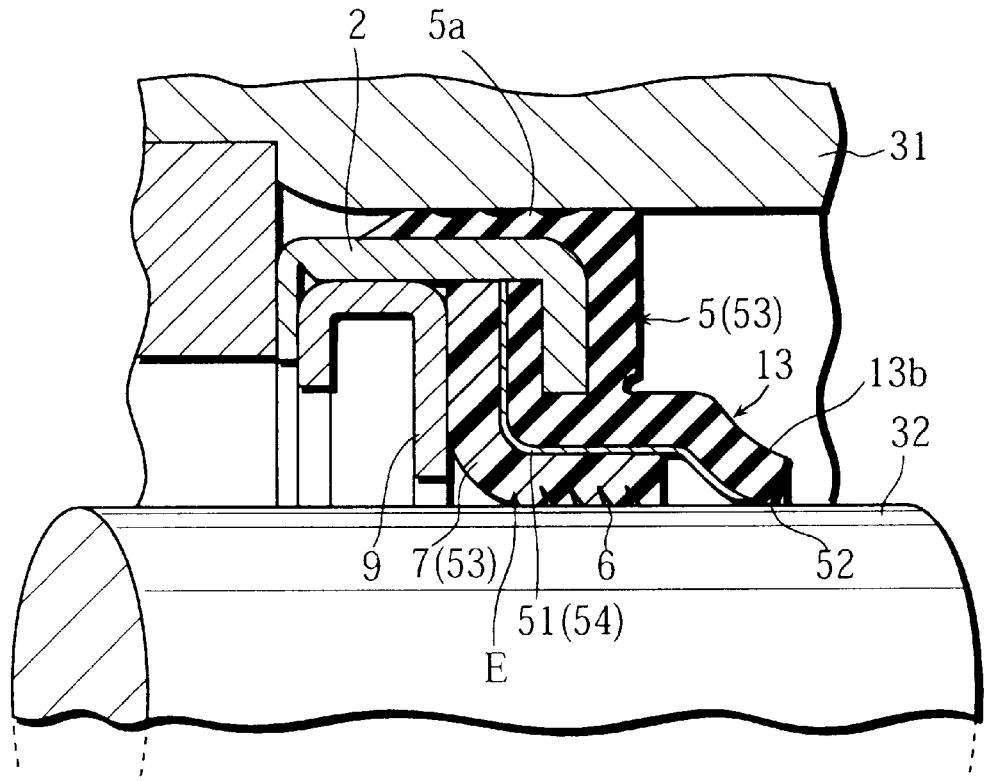
FIG. 31 is a partial cross-sectional side view showing a fifth preferred embodiment of the present invention.
Figure 32:
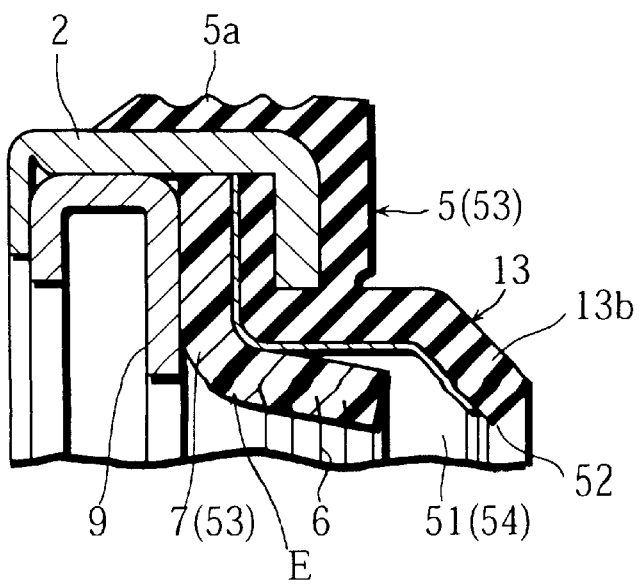
FIG. 32 is a partial cross-sectional side view showing a pre-attachment state.

That is to say, as shown in FIG. 31, a gas shielding member 51, which shields cooling medium gas ($CO_2$) permeating seal portions 53 comprising the seal element E and the seal member 5 of rubber, is attached instead of the supporting metal 12. And, in FIG. 31, the seal element E is composed of only one seal element 7.

To describe concretely, a circular metal thin plate 54 as the gas shielding member 51 is disposed between neighboring two seal portions 53 (the (first) seal element 7 and the seal member 5 of rubber) except a sliding portion 52 which slides on the rotation shaft 32. The metal thin plate 54 tightly fit to the inner peripheral face of the seal member 5 almost entirely except only the sliding portion 52 of the lip end portion 13b. That is to say, the metal thin plate 54 is preliminary formed as to tightly fit to the inner peripheral face of the lip portion 13 in a free state before the seal is attached shown in FIG. 32, and an end portion of the metal thin plate 54 pushes the lip portion 13 to the periphery side with slight force as the lip portion 13 is raised a little. Therefore, the metal thin plate 54 is kept tightly fitting to the inner peripheral face of the lip portion 13 in the state in which the seal is attached to the rotation shaft 32. The metal thin plate 54 is held between the both seal portions 53 by force of the both seal portions 53 (the (first) seal element 7 and the seal member 5 of rubber) pushing each other. And, the metal thin plate 54 is also for supporting the seal portion 53 (the seal member 5 of rubber). And, the metal thin plate 54 may be attached to the seal portion 53 (the seal member 5 of rubber) with adhesive.

Carbon dioxide, used as the cooling medium in the compressor, has considerably high permeability against rubber and resin, material for the seal portion 53. For this, the metal thin plate 54 blocks up a passage of the cooling medium gas permeable to rubber and resin (including passages of gas permeation through the seal portions 53) almost entirely as to shield between an inner side and an atmosphere (outer) side of a housing 31. That is to say, the cooling medium gas in the housing 31 is mostly shielded by the metal thin plate 54 to enhance sealing characteristics of the seal. The metal thin plate 54 is flexible as not to spoil the elasticity of the seal portion 53 (the seal member 5 of rubber), and able to deform along the seal portion 53 (the seal member 5 of rubber) keeping the fitting.

The metal thin plate 54 is different from the supporting metal 12 made of metal in fitting and holding ability to the seal portion 53 (the seal member 5 of rubber) which is caused by difference of thickness. In the attached state of the seal, the metal thin plate 54 can deform elastically along the seal portion 53 (the seal member 5 of rubber) keeping the fitting because the plate 54 is thin, while the relatively thick and rigid supporting metal 12, unable to deform elastically along the seal portion 53 keeping the fitting to the seal portion 53, parts from the seal portion 53.

The thickness of the metal thin plate 54 is, for example, around 0.1 mm to 0.5 mm. For this thinness, the metal thin plate 54 can push and fit to the seal member 5 of rubber with a very slight force, deform elastically along the elastic deformation of the seal member 5 of rubber which contacts the peripheral face of the rotation shaft 32, and the fitting state of the metal thin plate 54 and the seal member 5. The thickness of the metal thin plate 54 may be set to be other values within a range in which the above characteristics (the fitting and holding ability) is obtained. Although the values are influenced by metals used for the metal thin plate 54, a certain effect is expected with a thickness less than 0.6 mm. Especially, a considerable effect is expected with a thickness less than 0.4 mm, and a remarkable effect is expected with a thickness less than 0.2 mm. The thickness is by no means restricted to these values.

The material of the metal thin plate 54 is, for example, iron in the present embodiment, while stainless steel and aluminum may be used. As other metals, general metals used industrially and generally such as copper, nickel, zinc, lead, tin, etc. may be widely used.

Figure 33:
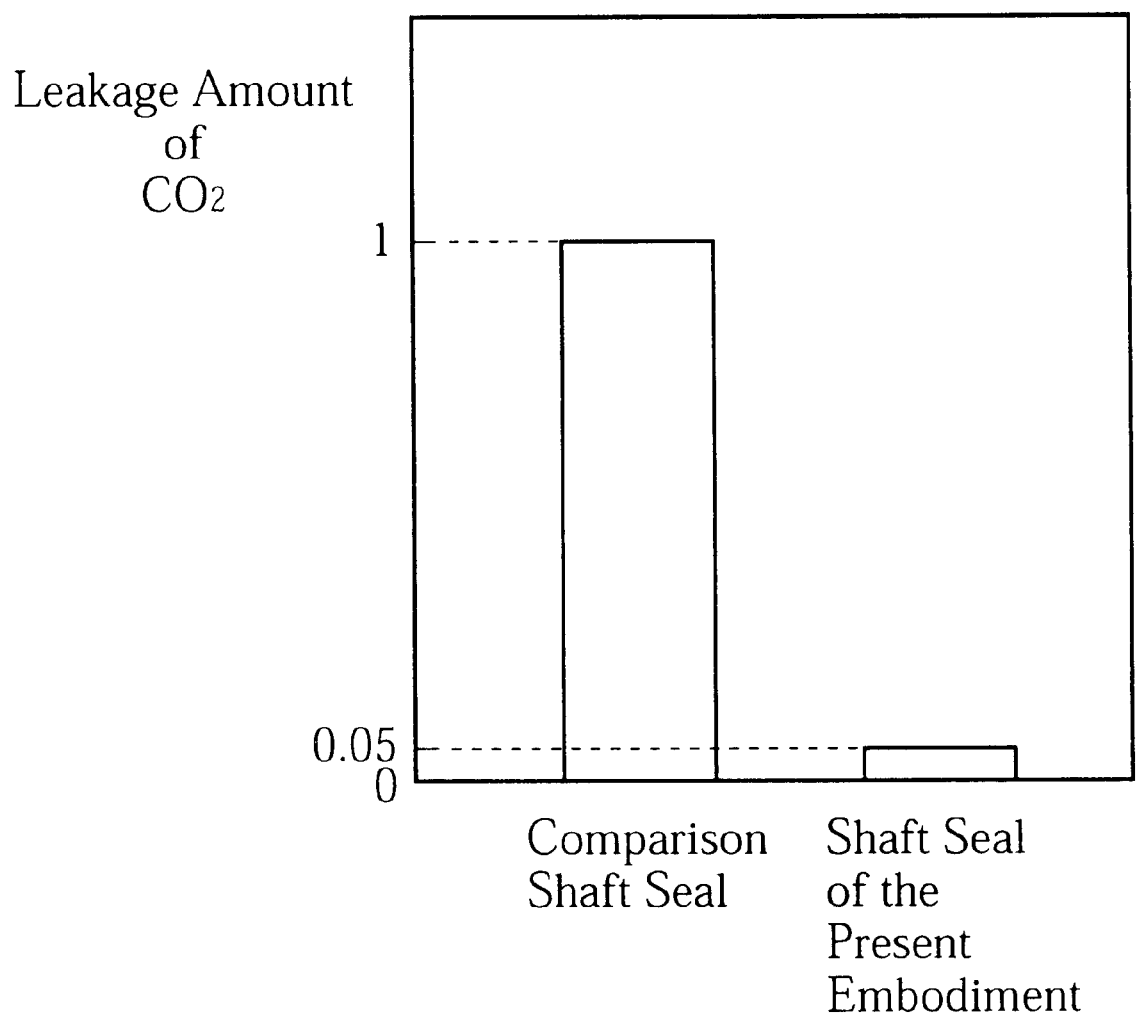
FIG. 33 is a graph showing effect of the seal.

The rotation shaft seal of the present embodiment provided with the metal thin plate 54 was compared with another comparison shaft seal not provided with the metal thin plate 54 in gas-leakage restricting effect, and the result shown in a graph of FIG. 33 was obtained. Carbon dioxide was used as the cooling medium, and amount of leakage of the cooling medium gas from a position between the rotation shaft 32 and the housing 31 was measured on the compressor of each of the seal. As shown in the graph of FIG. 33, amount of gas leakage of the seal of the present embodiment is reduced to 1/20 of that of the comparison shaft seal.

Therefore, according to the present embodiment, following effects are obtained.

(1) Leakage of the cooling medium gas is regulated to be very small when the cooling medium is carbon dioxide having high permeation against rubber and resin, namely material of the seal portions 53, because the metal thin plate 54 tightly fits to the surface of the seal portion 53 (the seal member 5 of rubber) as to shield the passage of the gas (attachment area of the seal) almost entirely. Therefore, early shortage of the cooling medium in the compressor and reduction of cooling effect by the shortage of the cooling medium are prevented.

(2) The passage of the gas is more widely blocked to enhance the sealability because the metal thin plate 54 fits to the seal portion 53 (the seal member 5 of rubber) covering a large area to the end portion of the lip portion 13 except the sliding portion 52. And, if the seal portion 53 (the seal member 5 of rubber) parts from the metal thin plate 54 on its middle portion, leakage of carbon dioxide is not generated because the metal thin plate 54 fits to the seal portion 53 (the seal member 5 of rubber) even near the end portion.

(3) Gaps between the metal thin plate 54 and the seal portion 53 (the seal member 5 of rubber) are limited to generate and the passage of gas leakage is blocked by the metal thin plate 54 sandwiched between the two seal portions 53 (the (first) seal element 7 and the seal member 5 of rubber), and high sealing ability is obtained.

(4) The metal thin plate 54, working also as the supporting metal 12, contributes to improvement of the sealability of the seal portion 53 (the seal member 5 of rubber).

(5) In case that the metal thin plate 54 is attached to the surface of the seal portion 53 (the seal member 5 of rubber) with adhesive, gaps are not generated between the metal thin plate 54 and the seal portion 53 (the seal member 5 of rubber), and the sealing ability is enhanced thereby.

Figure 34:
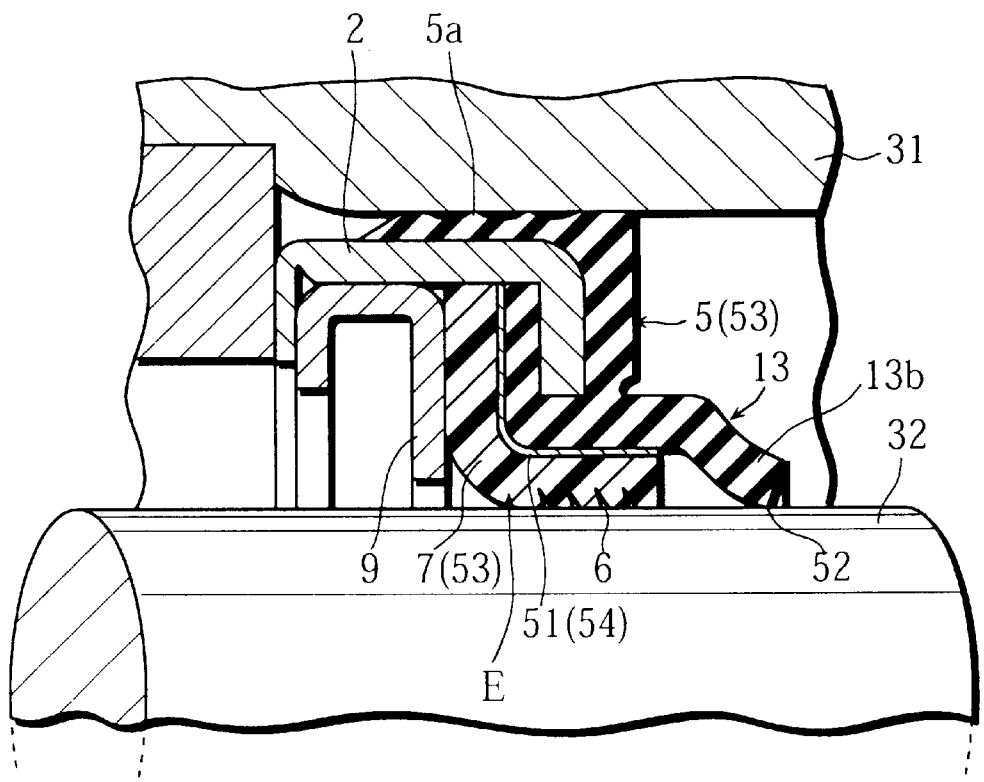
FIG. 34 is a partial cross-sectional side view showing a first modification of the fifth preferred embodiment.

Next, FIG. 34 shows a first modification of the fifth preferred embodiment. Same parts in the fifth preferred embodiment are indicated with same marks, and explanation of them is omitted.

That is to say, the metal thin plate 54, shorter than the metal thin plate 54 of the above embodiment (shown in FIG. 31), exists only on a border area of the two seal portions 53 (the (first) seal element 7 and the seal member 5 of rubber). This is to prevent the rigidity of the metal thin plate 54 from spoiling the elasticity of the lip portion 13. The lip portion 13 can deform elastically into an appropriate configuration for sealing when the lip portion 13 contacts the peripheral face of the rotation shaft 32, and the sliding portion 52 is pressed to contact the peripheral face of the rotation shaft 32 firmly.

Therefore, according to the first modification, following effect is obtained.

(6) In comparison with the above embodiment, sealing ability at the sliding portion 52 of the lip end portion 13b is enhanced although gas leakage by permeation is slightly inferior to that of the above embodiment.

Figure 35:
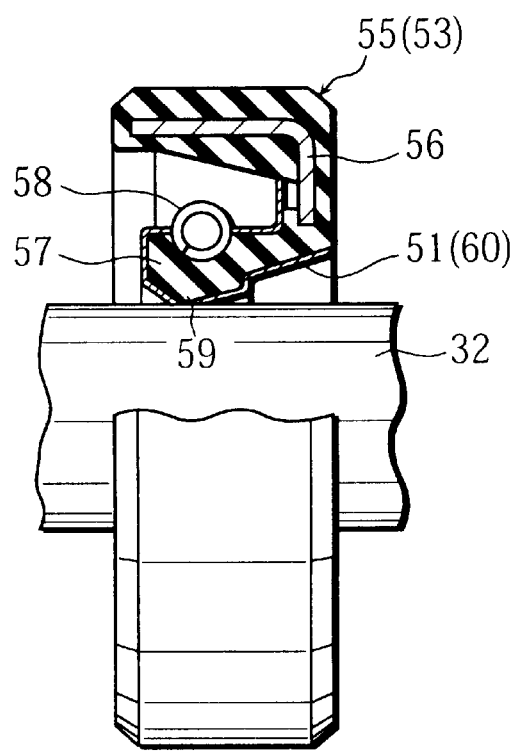
FIG. 35 is a partial break side view showing a second modification of the fifth preferred embodiment.
Figure 36:
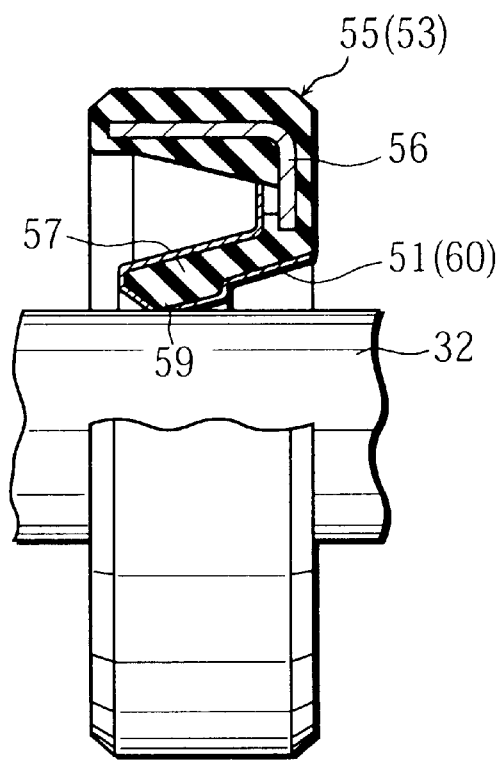
FIG. 36 is a partial break side view showing a third modification of the fifth preferred embodiment.

Next, FIG. 35 shows a second modification and FIG. 36 shows a third modification. These are seals of different types from that of the former embodiments.

That is to say, as shown in the second modification in FIG. 35, this seal is provided with a seal member 55 of rubber as the seal portion 53. The configuration of the seal member 55 of rubber is kept circular by a holding metal 56 embedded in the seal member 55. The seal member 55 of rubber has a sealing lip portion 57 which extends to an inner peripheral side. The sealing lip portion 57 is pushed to the rotation shaft 32 by pushing force of a ring spring 58 attached to a back face (outer peripheral face) of the sealing lip portion 57, and a sliding portion 59 of the sealing lip portion 5T is pressed to the peripheral face of the rotation shaft 32.

And, as shown in the third modification in FIG. 36, this seal is provided with a seal member 55 of rubber as the seal portion 53. The configuration of the seal member 55 of rubber is kept circular by a holding metal 56 embedded in the seal member 55. The seal member 55 of rubber has a sealing lip portion 57 which extends to an inner peripheral side. The sealing lip portion 57 is not provided with the ring spring 58 in FIG. 35, the sliding portion 59 is pressed to the rotation shaft 32 by elastic force of rubber.

In both types of FIG. 35 and FIG. 36, the sealing lip portion 57 is covered entirely with metal film 60 as the gas shielding member 51 except the sliding portion 59. The metal film 60, for the same purpose in the former embodiments, namely blocking the passage of the cooling medium gas (including permeation passage in the rubber), covers the passage of the gas almost entirely.

In the present embodiment, the metal film 60 is a metal evaporation film. The metal film 60 is not restricted to the metal evaporation film, and may be formed with other film forming methods, for example, plating (electroless plating). And, material for the metal film 60 is, for example, gold with which a gold evaporation film is made. Other metals, with which a fine metal film can be formed, such as iron, stainless steel, aluminum, nickel, tin, silver, copper, etc., may be used. The thickness of the metal film 60, with which the permeation of the gas is stopped, for example, around 10 to 100 $\mu$m.

Therefore, according to the second and third modifications, following effect is obtained.

(7) Wide area of the passage of the gas including near the sliding portion 59 is blocked because the surface of the seal member 55 of rubber is covered with the metal film 60. And, elasticity of the sealing lip portion 57 is hardly spoiled for the metal film 60 of which thickness is thinner than that of the metal thin plate 54 in the former embodiments. And, flexibility (ability to deform elastically) of the sealing lip portion 57 is secured, and the sealability at the sliding portion 59 is enhanced thereby.

Figure 37:
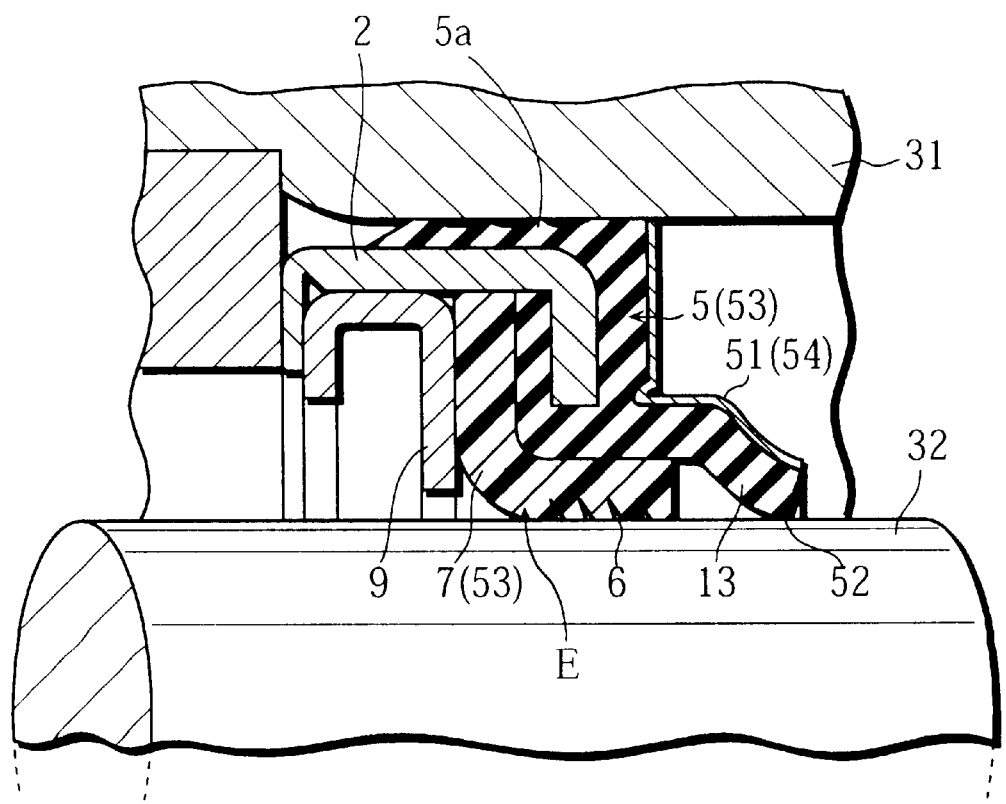
FIG. 37 is a partial cross-sectional side view showing a fourth modification of the fifth preferred embodiment.
Figure 38:
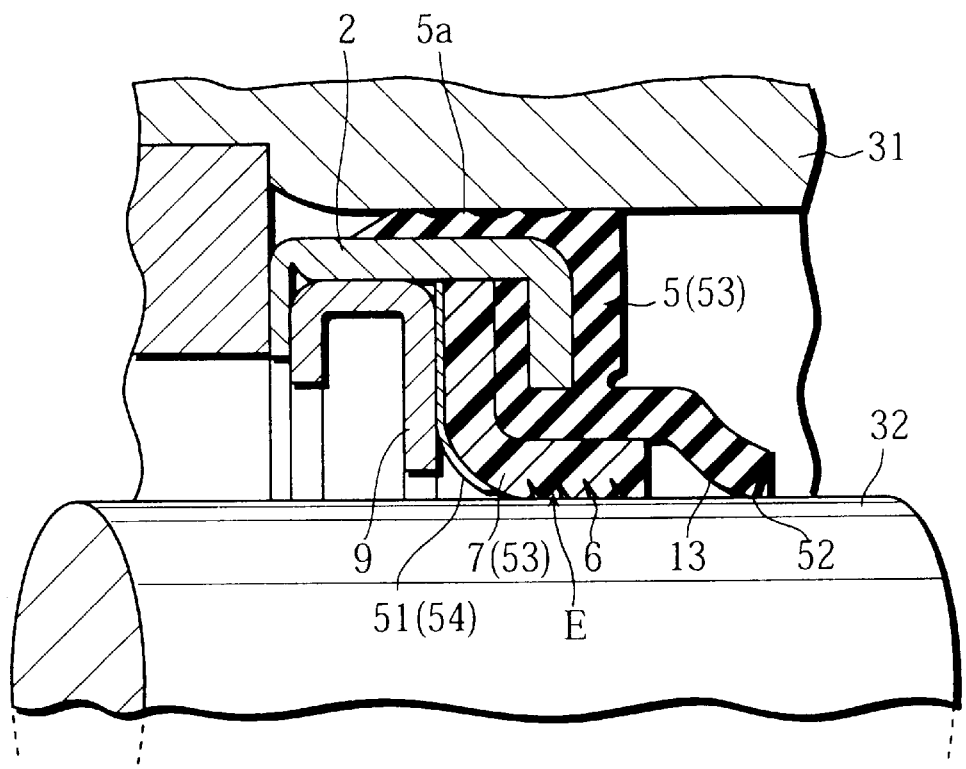
FIG. 38 is a partial cross-sectional side view showing a fifth modification of the fifth preferred embodiment.

The fifth preferred embodiment of the present invention, not restricted to the above description, may be practiced with following features. That is to say, position of the metal thin plate 54 is not restricted to between the two seal portions 53. For example, as shown in FIG. 37, the metal thin plate 54 may be fitted to the peripheral face side of the seal member 5 of rubber. And, as shown in FIG. 38, the metal thin plate 54 may be fitted to the inner peripheral face of the (first) seal element 7 (of resin). Also with these compositions, leakage of cooling medium gas having high permeability against rubber and resin such as carbon dioxide is limited to be small because the cooling medium gas in the housing 31 is shielded by the metal thin plate 54 fit to the surface of the seal portion 53 and elastically deforms along the seal portion 53. And, the seal portion 53 is kept by the metal thin plate 54 (a backup ring) supporting the seal portion 53 in FIG. 38.

Figure 39:
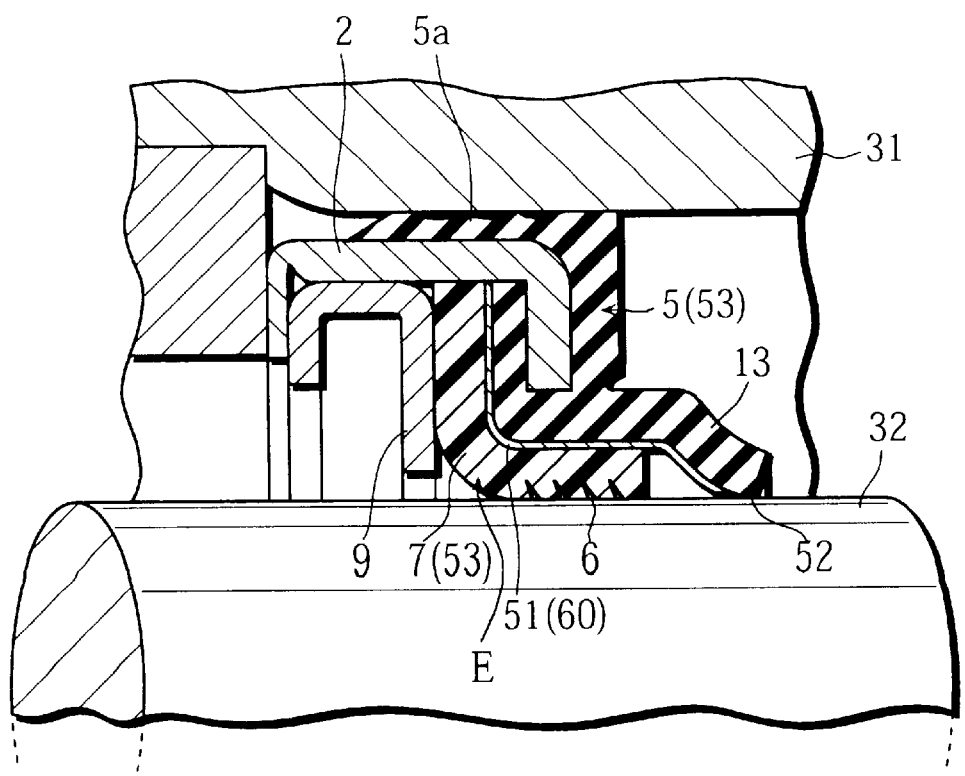
FIG. 39 is a partial cross-sectional side view showing a sixth modification of the fifth preferred embodiment.

And, as shown in FIG. 39, the metal film 60 covering the inner peripheral face of the seal portion 53 (the seal member 5 of rubber) may be used instead of the metal thin plate 54 shown in FIG. 31. According to this construction, carbon dioxide as the cooling medium gas in the housing 31 is mostly shielded by the metal film 60, and leakage of the cooling medium gas is certainly limited to be small. Further, sealability at the sliding portion 52 is not spoiled because the elasticity (flexibility) of the lip end portion 13b of the lip portion 13 is not spoiled. And, the metal film 60 may be used instead of the metal thin plate 54 in FIG. 37 and FIG. 38.

Figure 40:
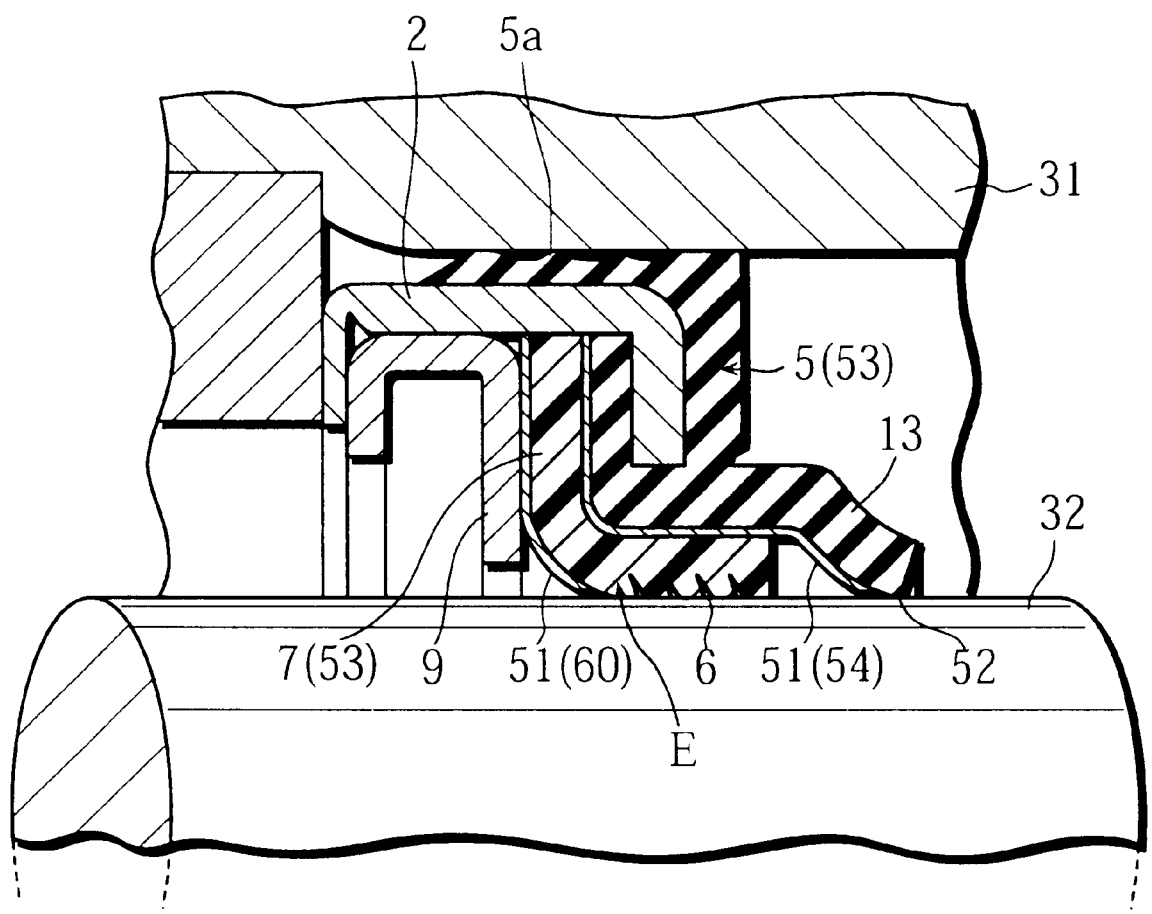
FIG. 40 is a partial cross-sectional side view showing a seventh modification of the fifth preferred embodiment.

And, the seal portion 53, covered with the gas shielding member 51 such as the metal thin plate 54 and the metal film 60, is not restricted to one construction as in the former embodiments. For example, surfaces of each of the two seal portions 53 may be covered with the gas shielding member 51. As shown in FIG. 40, for example, the metal thin plate 54 is fitted to the inner peripheral face of the seal member 5 as the metal thin plate 54 works also as the supporting metal 12, and the metal film 60 is formed on inner peripheral face of the (first) seal element 7. The both of the gas shielding members 51 may be the metal thin plate 54 or the metal film 60. And, the gas shielding member 51 may be disposed on both sides of all of the seal portions 53 to multi-shield the gas.

And, the metal thin plate 54 and the metal film 60 are not restricted to fitting to the surface of the seal portion 53. For example, the metal thin plate 54 may be embedded in the seal portion 53. A seal portion 53 in which metal foil such as aluminum foil (or sheet metal) is laminated is applicable.

According to this construction, long-term reliability is secured because the metal foil is extendable to the whole of the seal portion 53 in radial direction, and not worn out like the metal foil 60 exposed on the surface. And, the metal foil does not spoil the elasticity of the seal portion 53 and the sealability at the sliding portion of the seal portion 53.

And, material of the gas shielding member 51 is not restricted to metals. Any other materials, which can block the gas having high permeability against the seal portion 53 of rubber or resin such as carbon dioxide and ammonium, may be used. For example, ceramic may be used. In this case, it is preferable to form a ceramic film.

And, type of the rotation shaft seal is not restricted to the above preferred embodiments. the seal element E may be composed of two seal elements made of resin, and combined with a seal element made of rubber. In this case, the gas shielding member 51 (the metal thin plate 54 or the metal film 60) may be fitted to any of the three seal elements.

And, the rotation shaft seal may be applied to apparatuses other than a compressor.

In the present invention, not restricted to the above-described preferred embodiments, some of the individual constructions in the first through the fifth preferred embodiments may be combined in various ways.

According to the rotation shaft seal of the present invention, excellent sealability and durability are demonstrated because the supporting metal 12 tightly fits to and certainly supports the back face of the seal member 5 of rubber to prevent the seal member 5 of rubber from being deformed in pressure reception, and, the slope receiving face A tightly fits to and certainly holds the back face of the lip end portion 13b to prevent the lip end portion 13b from being deformed in pressure reception.

Especially, the contact area with which the end of the lip end portion 13b slides on the rotation shaft 32 is prevented from increase, heat and abrasion are prevented, and life of the seal is extended.

And, for the high hardness of rubber, sealing ability and durability are made better by synergistic effect with the supporting metal 12.

Further, the end corner portion of the supporting metal 12 is prevented effectively from biting into the back face of the lip nd portion 13b to cause fissures, and life of the seal member 5 is extended thereby.

And, according to the rotation shaft seal of the present invention, deformation of the lip end portion 13b is reduced especially under high pressure, because the lip end portion 13b is reinforced by the supporting metal 12 and the reinforcing cover metal 21, the tip end portion 14 linearly contact the rotation shaft 32 to secure high sealability, and abrasion of the lip portion is reduced to improve durability.

And, in operation state in which pressure in the fluid storing chamber 33 is increased, the contact pressure of the lip end portion 13b to the rotation shaft 32 is decreased to reduce abrasion of the lip end portion 13b.

Especially, the contact pressure with which the end of the lip end portion 13b slides on the rotation shaft 32 is prevented from increase, heat and abrasion are prevented, and life of the seal is extended.

And, in operation state in which pressure in the fluid storing chamber 33 is increased, the seal has excellent durability with which fissures on the root of the lip portion 13 and exfoliation (of adherence) of the seal member 5 of rubber (the inner brim cover portion 5b) from the outer case 1 (the inner brim portion 2) are hardly generated.

And, the contact pressure of the lip end portion 13b to the rotation shaft 32 is decreased further to reduce the abrasion of the lip end portion 13b.

And, according to the rotation shaft seal of the present invention, the force working on the rotation shaft 32 in the pressurized state of the fluid storing chamber 33 becomes small and abrasion of the lip end portion 13b is reduced because tightening force is not generated (or slightly generated) when the seal is attached to the rotation shaft 32 (in unpressurized state).

Especially, the contact area with which the lip end portion 13b slides on the rotation shaft 32 is prevented from increase, heat and abrasion are prevented, and life of the seal is extended. And this is preferable for an operational condition in which the pressure in the fluid storing chamber 33 is always positive.

Further, according to the rotation shaft seal of the present invention, high sealability against gas highly permeative through the material of the seal portion 53 is obtained because the gas is mostly shielded by the gas shielding member 51 fitting to at least one seal member 53 almost entirely in radial direction.

And, gas leakage is reduced by blocking the passage of gas with two seal portions 53 sandwiching the gas shielding member 51 to restrict the gap.

Further, it is needless to treat the seal portion 53 with laborious treatment such as film forming because the gas shielding member 51 is a metal plate (the metal thin plate 54), and the configuration of the seal member 53 is kept by holding the seal portion 53.

And, according to the rotation shaft seal of the present invention, the elasticity (flexibility) of the seal portion 53 is hardly spoiled because the gas shielding member 51 of which material is metal, ceramic, etc. is a shielding film covering the seal portion 53, and sealability of the seal portion 53 to the peripheral face of the rotation shaft 32 at the sliding portions 52 and 59 is secured.

And, it is relatively easy to form the film technically and high restricting ability against the gas permeation is obtained because the shielding film is the metal film 60.

Further, it is needless to treat the seal portion 53 with laborious treatment such as film forming because the gas shielding member 51 is the supporting member 12, and the configuration of the seal portion 53 is kept by holding the seal portion 53.

While preferred embodiments of the present invention have been described in this specification, it is to be understood that the invention is illustrative and not restrictive, because various changes are possible within the spirit and indispensable features.

What is claimed is:

1. A rotation shaft seal provided with a seal element, which contacts a rotation shaft, disposed between a housing and the rotation shaft, and a seal member of rubber having a lip end portion which contacts the rotation shaft and disposed on a fluid storing chamber side to the seal element, comprising a construction in which:

the lip end portion has a predetermined inclination angle to an axis of the rotation shaft;

a supporting metal, having a slope receiving face forming the predetermined inclination angle with the axis of the rotation shaft, supports a part from an inner peripheral face of the lip end portion, gradually decreasing in diameter to the fluid storing chamber side, to a back face of a standing portion of the seal member standing in a direction at right angles with the rotation shaft, through an inner peripheral face of a short cylinder portion of the seal member parallel to the rotation shaft; and a reinforcing cover metal, covering a part from a peripheral face of the lip end portion to a peripheral face of the cylinder portion, is uniformly attached to an inner brim portion disposed in a standing portion of an outer case.

2. A rotation shaft seal provided with a seal element, which contacts a rotation shaft, disposed between a housing and the rotation shaft, and a seal member of rubber having a lip end portion which contacts the rotation shaft and disposed on a fluid storing chamber side to the seal element, comprising a construction in which:

the lip end portion has a predetermined inclination angle to an axis of the rotation shaft;

a supporting metal, having a slope receiving face forming the predetermined inclination angle with the axis of the rotation shaft, contacts and directly supports a part from an inner peripheral face of the lip end portion, gradually decreasing in diameter to the fluid storing chamber side, to a back face of a standing portion of the seal member standing in a direction at right angles with the rotation shaft, through an inner peripheral face of a short cylinder portion of the seal member parallel to the rotation shaft; and a reinforcing cover metal, covering a part from a peripheral face of the lip end portion to an outer face of the standing portion through a peripheral face of the cylinder portion is uniformly attached to the seal member of rubber.

3. A rotation shaft seal provided with a seal element, which contacts a rotation shaft, disposed between a housing and the rotation shaft, and a seal member of rubber having a lip end portion which contacts the rotation shaft and disposed on a fluid storing chamber side to the seal element, comprising a construction in which the seal member of rubber elastically deforms in an axis direction of the rotation shaft accompanied with pressure increase of the fluid storing chamber, a peripheral end of a supporting metal which is directly touching and held by an outer case is pressed to the seal member of rubber as to be held without an aperture, and the lip end portion is drawn in a parting direction from the rotation shaft.

4. A rotation shaft seal provided with a seal element, which contacts a rotation shaft, disposed between a housing and the rotation shaft, and a seal member of rubber having a lip end portion which contacts the rotation shaft and disposed on a fluid storing chamber side to the seal element, comprising a construction in which a gap portion is formed between the seal member of rubber and a supporting metal arranged as to support a back face of the seal member of rubber, a peripheral end of the supporting metal which is directly touching and held by an outer case is pressed to the seal member of rubber as to be held without an aperture, the seal member of rubber elastically deforms as to get into the gap portion accompanied with pressure increase of the fluid storing chamber, and the lip end portion is drawn in a parting direction from the rotation shaft.

5. The rotation shaft seal as set forth in claim 4, wherein the lip end portion has a predetermined inclination angle to an axis of the rotation shaft, the supporting metal has a slope receiving face forming the predetermined inclination angle with the axis of the rotation shaft, and the slope receiving face supports a back face of the lip end portion gradually decreasing in diameter to the fluid storing chamber side.

6. The rotation shaft seal as set forth in claim 3, 4 or 5, wherein an R portion is formed on a root of a lip portion having the lip end portion on the fluid storing chamber side as to reduce elastic deformation of the root of the lip portion caused by pressure increase of the fluid storing chamber.

7. A rotation shaft seal provided with plural seal portions of ring to prevent fluid leakage along a peripheral face of a rotation shaft by sliding portions of the seal portions sliding on a peripheral face of the rotation shaft, comprising an elastically-deformable gas shielding member made of a shielding film covering the seal portion which is fitted to at least one of the seal portions except the sliding portions and shielding gas until near the sliding portions, wherein the gas shielding member is disposed as to be sandwiched between the two neighboring seal portions.

8. A rotation shaft seal provided with a seal element, disposed between a housing and the rotation shaft, having a sliding portion which slides on a rotation shaft, and a seal member of rubber having a lip end portion provided with a sliding portion which slides on the rotation shaft and disposed on a fluid storing chamber side to the seal element, comprising a gas shielding member, which can deform elastically with and keep fitted to the seal element, is fitted to the seal portion except the sliding portions, and the seal member having a cylindrical cover portion whose peripheral face is formed undulate in a free state to elastically contact an inner peripheral face of the housing for seal operation, wherein the gas shielding member is disposed as to be sandwiched between the two neighboring seal portions.

9. A rotation shaft seal provided with plural seal portions of ring to prevent fluid leakage along a peripheral face of a rotation shaft by sliding portions of the seal portions sliding on a peripheral face of the rotation shaft, comprising an elastically-deformable gas shielding member made of a metal film covering the seal portion which is fitted to at least one of the seal portions except the sliding portions and shielding gas until near the sliding portions, wherein the gas shielding member is disposed as to be sandwiched between two neighboring seal portions.

10. A rotation shaft seal provided with a seal element, disposed between a housing and the rotation shaft, having a sliding portion which slides on a rotation shaft, and a seal member of rubber having a lip end portion provided with a sliding portion which slides on the rotation shaft and disposed on a fluid storing chamber side to the seal element, comprising a gas shielding member made of a shielding film, which can deform elastically with and keep fitted to the seal element or the seal member of rubber as a seal portion, is fitted to the seal portion except the sliding portions, wherein the gas shielding member is disposed as to be sandwiched between two neighboring seal portions.

11. A rotation shaft seal provided with a seal element, disposed between a housing and the rotation shaft, having a sliding portion which slides on a rotation shaft, and a seal member of rubber having a lip end portion provided with a sliding portion which slides on the rotation shaft and disposed on a fluid storing chamber side to the seal element, comprising a gas shielding member made of a metal film, which can deform elastically with and keep fitted to the seal element or the seal member of rubber as a seal portion, is fitted to the portion except the sliding portions, wherein the gas shielding member is disposed as to be sandwiched between two neighboring seal portions.

* * * * *